(12) United States Patent
Behrens et al.

(10) Patent No.: US 11,976,196 B2
(45) Date of Patent: May 7, 2024

(54) SILK PACKAGING APPLICATIONS

(71) Applicant: Cambridge Crops, Inc., Somerville, MA (US)

(72) Inventors: Adam M. Behrens, Cambridge, MA (US); Sezin Yigit, Arlington, MA (US); Laith M. Abu-Taleb, Washington, DC (US); Lester Cheuk-Yin Chong, Somerville, MA (US); Colin D. Preston, Salem, MA (US)

(73) Assignee: Cambridge Crops, Inc., Somerville, MA (US)

( * ) Notice: Subject to any disclaimer, the term of this patent is extended or adjusted under 35 U.S.C. 154(b) by 0 days.

(21) Appl. No.: 17/230,822

(22) Filed: Apr. 14, 2021

(65) Prior Publication Data
US 2022/0332948 A1    Oct. 20, 2022

(51) Int. Cl.
*B32B 9/02* (2006.01)
*C08L 89/00* (2006.01)
*C09D 189/00* (2006.01)

(52) U.S. Cl.
CPC ............... *C08L 89/00* (2013.01); *B32B 9/02* (2013.01); *C09D 189/00* (2013.01); *B32B 2307/412* (2013.01); *B32B 2307/7244* (2013.01); *B32B 2307/7246* (2013.01); *B32B 2439/70* (2013.01); *C08L 2203/16* (2013.01)

(58) Field of Classification Search
None
See application file for complete search history.

(56) References Cited

U.S. PATENT DOCUMENTS

| 4,233,212 A | 11/1980 | Otoi et al. |
| 5,853,764 A | 12/1998 | Tsubouchi |

(Continued)

FOREIGN PATENT DOCUMENTS

| WO | WO 2007/016524 A2 | 2/2007 |
| WO | WO 2012/145739 A1 | 10/2012 |

(Continued)

OTHER PUBLICATIONS

Cho et al. (Molecular weight distribution and solution properties of silk fibroins with different dissolution conditions, International Journal of Biological Macromolecules 51 (2012) 336-341, 6 pages.*

(Continued)

*Primary Examiner* — Tae H Yoon
(74) *Attorney, Agent, or Firm* — Arrigo, Lee, Guttman & Mouta-Bellum LLP; Carla Mouta-Bellum

(57) ABSTRACT

Aspects of the present disclosure pertain to compositions and methods for preparing silk films for use in food packaging. Exemplary compositions of the present disclosure comprise silk films and packaging coatings as a replacement for traditional food packaging, such as single-use plastic packaging, and/or to extend the shelf-life of foods. The natural bio-based silk coatings of the present disclosure may be odorless, low cost, edible, compostable, come from a renewable source, removable from the packaging for recycling, and are biodegradable. In some embodiments, the silk films and packaging coatings may prolong the shelf-life, enhance or maintain the quality and safety, and/or provide indication of and regulate the freshness of food products.

18 Claims, 19 Drawing Sheets

(56) References Cited

U.S. PATENT DOCUMENTS

| | | | |
|---|---|---|---|
| 8,354,501 B2 | 1/2013 | Kaplan et al. | |
| 9,409,959 B2* | 8/2016 | Sutherland | A61P 43/00 |
| 9,731,052 B2 | 8/2017 | Kaplan et al. | |
| 10,271,561 B2 | 4/2019 | Omenetto et al. | |
| 11,147,282 B2 | 10/2021 | Omenetto et al. | |
| 2007/0249803 A1* | 10/2007 | Mattes | C08G 73/0266 |
| | | | 528/422 |
| 2013/0316098 A1* | 11/2013 | Lubnin | C09D 175/04 |
| | | | 428/32.21 |
| 2015/0071978 A1* | 3/2015 | Chang | A61N 2/06 |
| | | | 424/402 |
| 2015/0141910 A1* | 5/2015 | Francis | A61M 37/0015 |
| | | | 264/255 |
| 2016/0046679 A1 | 2/2016 | Kluge et al. | |
| 2016/0168290 A1* | 6/2016 | Hlavinka | C08F 10/14 |
| | | | 428/36.9 |
| 2016/0243106 A1* | 8/2016 | Ashley | C07D 519/00 |
| 2016/0333172 A1* | 11/2016 | Koch | C08L 23/0807 |
| 2019/0309467 A1* | 10/2019 | Altman | D06N 7/00 |
| 2019/0343137 A1 | 11/2019 | Omenetto et al. | |
| 2020/0129419 A1* | 4/2020 | Xu | A61K 9/006 |
| 2020/0256009 A1* | 8/2020 | Altman | D06M 15/643 |

FOREIGN PATENT DOCUMENTS

| | | | |
|---|---|---|---|
| WO | WO 2014/145002 A2 | 9/2014 | |
| WO | WO 2015/134865 A1 | 9/2015 | |
| WO | WO 2021/055903 A1 * | 3/2021 | |
| WO | 2020198648 A1 | 10/2021 | |

OTHER PUBLICATIONS

International Search Report and Written Opinion for PCT/US19/65268, dated Mar. 23, 2020.

Day, BPF. "Fruit and Vegetables." *Principles and Applications of Modified Atmosphere Packaging of Foods*, Springer-Verlag, 1993, pp. 114-133.

Ajisawa, "Dissolution of silk fibroin with calcium chloride/ethanol aqueous solution," J. Seric. Sci. Jpn., 67(2):91-94, (1998).

Ali et al., "Gum arabic as a novel edible coating for enhancing shelf-life and improving postharvest quality of tomato (*Solanum lycopersicum* L.) fruit," Postharvest Biology and Technology, 58:42-47, (2010).

Basal et al., "Antibacterial Properties of Silk Fibroin/Chitosan Blend Films Loaded with Plant Extract," Fibers and Polymers, 11(1):21-27, (2010).

Boulet-Audet et al., "Dry-Spun Silk Produces Native-Like Fibroin Solutions," Biomacromolecules, 17(10):3198-3204, (2016).

Cheng et al., "Differences in regenerated silk fibroin prepared with different solvent systems: From structures to conformational changes," J. Appl. Polym. Sci., 41959:1-8, (2015).

Freddi et al., "Swelling and dissolution of silk fibroin (*Bombyx mori*) in N-methyl morpholine N-oxide," Int J Biol Macromol, 24(2-3):251-263, (1999).

Fuchs et al., "Effect of Edible Coatings on Postharvest Quality of Fresh Green Asparagus," Journal of Food Processing and Preservation, 32:951-971, (2008).

Furuhata et al., "Dissolution of silk fibroin in lithium halide/organic amide solvent systems," J. Seric. Sci. Jpn., 63(4):315-322, (1994).

Gobin et al., "Structural and mechanical characteristics of silk fibroin and chitosan blend scaffolds for tissue regeneration," J Biomed Mater Res A, 74(3):465-473, (2005).

Gong et al., "Two distinct beta-sheet fibrils from silk protein," Chem Commun (Camb), (48):7506-7508, (2009).

Haggag et al., "Degumming of Silk Using Microwave-Assisted Treatments," Journal of Natural Fibers, 4(3):1-22, (2007).

Hino et al., "Change in secondary structure of silk fibroin during preparation of its microspheres by spray-drying and exposure to humid atmosphere," J Colloid Interface Sci, 266(1):68-73, (2003).

Hu et al., "Determining Beta-Sheet Crystallinity in Fibrous Proteins by Thermal Analysis and Infrared Spectroscopy," Macromolecules, 39:6161-6170, (2006).

Jaramillo-Quiceno et al., "Water-annealing treatment for edible silk fibroin coatings from fibrous waste," J. Appl. Polym. Sci, 48505:1-8, (2019).

Kamalha et al., "Analysis of the secondary crystalline structure of regenerated *Bombyx mori* fibroin," RRBS, 7(2):76-83, (2013).

Khalifa et al., "Application of sericin to modify textile supports," The Journal of Textile Institute, 103(4):370-377, (2012).

Khan et al., "Physical properties and dyeability of silk fibers degummed with citric acid," Bioresour Technol, 101(21):8439-8445, (2010).

Kim et al., "Formulation of Biologically-Inspired Silk-Based Drug Carriers for Pulmonary Delivery Targeted for Lung Cancer," Sci Rep, 5:11878, (2015).

Kluge et al., "Optimizing molecular weight of lyophilized silk as a shelf-stable source material," ACS Biomater. Sci. Eng., (2016).

Kluge et al., "Silk-based blood stabilization for diagnostics," Proc Natl Acad Sci U S A, 113(21):5892-5897, (2016).

Koh et al., "Structures, mechanical properties and applications of silk fibroin materials," Progress in Polymer Science, 46:86-110, (2015).

Kundu et al., "Isolation and processing of silk proteins for biomedical applications," Int J Biol Macromol, 70:70-77, (2014).

Kweon et al., "Dissolution and Characterization of Regenerated *Antheraea pernyi* Silk Fibroin," Journal of Applied Polymer Science, 82:750-758, (2001).

Li et al., "Silk-based stabilization of biomacromolecules," J Control Release, 219:416-430, (2015).

Li et al., "Regenerated silk materials for functionalized silk orthopedic devices by mimicking natural processing," Biomaterials, 110:24-33, (2016).

Li et al., "Enhanced Stabilization in Dried Silk Fibroin Matrices," Biomacromolecules, 18:2900-2905, (2017).

Li et al., "Fabrication and characterization of microencapsulated n-octadecane with silk fibroin-silver nanoparticles shell for thermal regulation," Journal of Materials Research, 34(12):2047-2056, (2019).

Lin et al., "Cold plasma treated thyme essential oil/silk fibroin nanofibers against *Salmonella* Typhimurium in poultry meat," Food Packaging and Shelf Life, 21:100337, (2019).

Liu et al., "Exploring the Structural Transformation Mechanism of Chinese and Thailand Silk Fibroin Fibers and Formic-Acid Fabricated Silk Films," Int J Mol Sci, 19(11), 2018).

Lu et al., "Stabilization of Enzymes in Silk Films," Biomacromolecules, 10:1032-1042, (2009).

Lu et al., "Stabilization and Release of Enzymes from Silk Films," Macromol. Biosci., 10:359-368, (2010).

Malay et al., "Relationships between physical properties and sequence in silkworm silks," Sci Rep, 6:27573, (2016).

Marelli et al., "Silk Fibroin as Edible Coating for Perishable Food Preservation," Sci Rep, 6:25263, (2016).

Marelli et al., Supporting Information, "Silk Fibroin as Edible Coating for Perishable Food Preservation," Sci Rep, 6:25263, (2016).

Meng et al., "Controllable in situ synthesis of silver nanoparticles on multilayered film-coated silk fibers for antibacterial application," J Colloid Interface Sci, 461:369-375, (2016).

Meshram et al., "Extraction of lithium from primary and secondary sources by pre-treatment, leaching and separation: A comprehensive review," Hydrometallurgy, 150:192-208, (2014).

Pawcenis et al., "Size exclusion chromatography for analyses of fibroin in silk: optimization of sampling and separation conditions," Appl. Phys. A, 114:301-308, (2014).

Pritchard et al., "Encapsulation of Oil in Silk Fibroin Biomaterials," J. Appl. Polym. Sci., 39990:1-11, (2014).

Rnjak-Kovacina et al., "The effect of sterilization on silk fibroin biomaterial properties," Macromol Biosci, 15(6):861-874, (2015).

Rockwood et al., "Materials fabrication from *Bombyx mori* silk fibroin," Nat Protoc, 6(10):1612-1631, (2011).

Sah et al., "The extraction of fibroin protein from *Bombyx mori* silk cocoon: Optimization of process parameters," International Journal of Bioinformatics Research, 2(2):33-41, (2010).

(56) References Cited

OTHER PUBLICATIONS

Saha et al., "Extraction, Structural and Functional Properties of Silk Sericin Biopolymer from *Bombyx mori* Silk Cocoon Waste," J Textile Sci Eng, 9(1):1000390, (2019).
Sashina et al., "Dissolution of Silk Fibroin in N-methylmorpholine-N-oxide and Its Mixtures with Organic Solvents," Russian Journal of Applied Chemistry, 76(1):128-131, (2003).
Sashina et al., "Structure and Solubility of Natural Silk Fibroin," Russian Journal of Applied Chemistry, 79(6):869-876, (2006).
Shen et al., "Dissolution behavior of silk fibroin in a low concentration $CaCl_2$-methanol solvent: From morphology to nanostructure," Int J Biol Macromol, 113:458-463, (2018).
Silva et al., "Glycerin and Ethanol as Additives on Silk Fibroin Films: Insoluble and Malleable Films," J. Appl. Polym. Sci., (2013).
Sparkes et al., "Analysis of the pressure requirements for silk spinning reveals a pultrusion dominated process," Nat Commun, 8(1):594, (2017).
Srihanam et al., "Silk fibroin microspheres prepared by the water-in-oil emulsion solvent diffusion method for protein delivery," Korean J. Chem. Eng., 28(1):293-297, (2011).
Tabatabai et al., "Acid induced assembly of a reconstituted silk protein system," (2018).
Toms et al., "Determination of the Configuration of Silk Fibroin Dissolved in Aqueous Solutions of Lithium Bromide," Nature, 169:877-878, (1952).
Vaithanomsat et al., "Production of Water-Soluble Silk Powder from *Bombyx mori* Lin. (Nang-Noi Srisakate 1)," Kasetsart J. (Nat. Sci.), 40:152-158, (2006).
Vepari et al., "Silk as a Biomaterial," Prog Polym Sci, 32(8-9):991-1007, (2007).
Wang et al., "Colloidal Stability of Silk Fibroin Nanoparticles Coated with Cationic Polymer For Effective Drug Delivery," ACS Appl Mater Interfaces, 7(38):21254-21262, (2015).
Wang et al., "Effect of silk degumming on the structure and properties of silk fibroin," The Journal of the Textile Institute, (2018).
Wray et al., "Effect of processing on silk-based biomaterials: reproducibility and biocompatibility," J Biomed Mater Res B Appl Biomater, 99(1):89-101, (2011).
Wu et al., "Nanofiltration recovery of sericin from silk processing waste and synthesis of a lauroyl sericin-based surfactant and its characteristics," RSC Adv., 4:4140-4145, (2014).
Wu et al., "Control of silk microsphere formation using polyethylene glycol (PEG)," Acta Biomaterialia, (2016).
Yamada et al., "Preparation of undegraded native molecular fibroin solution from silkworm cocoons," Materials Science and Engineering C, 14:41-46, (2001).
Yazawa et al., "Influence of Water Content on the β-Sheet Formation, Thermal Stability, Water Removal, and Mechanical Properties of Silk Materials," Biomacromolecules, 17(3):1057-1066, (2016).
Zheng et al., "Lithium-free processing of silk fibroin," Journal of Biomaterials Applications, 31(3):450-463, (2016).
Zong et al., "Effect of pH and Copper(II) on the Conformation Transitions of Silk Fibroin Based on EPR, NPR, and Raman Spectroscopy," Biochemistry, 43:11932-11941, (2004).
Pawcenis et al., "Size exclusion chromatography for analyses of fibroin in silk: optimization of sampling and separation conditions", Appl. Phys., A 114, Feb. 2014, 301-308.
Pawcenis et al., "Evaluating the impact of different exogenous factors on silk textiles deterioration with use of size exclusion chromatography", Appl. Phys., A 122, May 9, 2016, 576, 10 pages.
Unknown, "Conventional GPC. Polymers and Molecular Weight", Agilent Technologies, GPC On Tour, Barcelona, Feb. 28, 2012, 44 pages.
International Search Report and Written Opinion of International Search Authority for co-pending International Application PCT/US21/27333, dated Sep. 10, 2021.

\* cited by examiner

SILK PACKAGING APPLICATIONS

FIELD OF THE DISCLOSURE

Aspects of the present disclosure pertain to compositions and methods for preparing silk films for use in food packaging.

BACKGROUND OF THE DISCLOSURE

One third of the food produced in the world is wasted each year and over 45% of all fruits and vegetables are lost to spoilage. Food waste has massive economic, social, and environmental implications. According to the Natural Resources Defense Council (NRDC), a prominent non-profit international environmental advocacy group, the United States loses 40% of its food supply resulting in an estimated economic loss of $165 billion per year. There is a broader societal need for methods of reducing food waste and increasing food availability by extending the shelf-life of perishables. Furthermore, the traditional materials for food packaging are derived from non-renewable resources of fossil fuels, which are accompanied by the challenges of recycling and disposal. For example, plastics are a common food packing material, but according to the U.S. Environmental Protection Agency, only 9% of plastics are recycled in the United States, with 75% of all plastics in the United States disposed in landfills. Bio-based packaging materials provide an alternative to other packaging materials, such as plastic, and can decrease carbon dioxide levels, reduce greenhouse gas emission levels, and consume less energy during the manufacturing cycle.

SUMMARY OF THE DISCLOSURE

Embodiments of the present disclosure represent significant environmental and commercial value by increasing revenue through improved distribution, reducing waste, and decreasing costs associated with cold storage and transport. Exemplary compositions of the present disclosure comprise silk films and packaging coatings as a replacement for traditional food packaging, such as single-use plastic packaging, and/or to extend the shelf-life of foods. The natural bio-based silk coatings of the present disclosure may be odorless, low cost, edible, compostable, come from a renewable source, removable from the packaging for recycling, and are biodegradable. In some embodiments, the silk films and packaging coatings may prolong the shelf-life, enhance or maintain the quality and safety, and/or provide indication of and regulate the freshness of food products.

Any aspect or embodiment described herein may be combined with any other aspect or embodiment as disclosed herein. While the present invention has been described in conjunction with the detailed description thereof, the description is intended to illustrate and not limit the scope of the present invention, which is partially defined by the scope of the appended claims. Other aspects, advantages, and modifications are within the scope of the following embodiments/claims.

BRIEF DESCRIPTION OF THE DRAWINGS

FIG. 3a shows the transparent paper sitting on a tabletop, while FIG. 3b shows the flexibility of the same transparent paper, as the paper may bend even though the silk has permeated the paper. The flexibility of the transparent paper may be improved by including additives in the silk solution, including plasticizers. In this case, FIG. 3b shows a piece of paper that included plasticizers in the silk solution

FIG. 4a shows a substrate that was sprayed with a silk solution. FIG. 4b shows a substrate with a portion coated with a silk solution by spraying that has dried and another portion that has no silk solution applied to the substrate.

FIG. 5a shows a doctor blade that may be used to apply silk solution to a substrate, which is paper in this example. FIG. 5b shows the silk solution after it is spread across the paper by the doctor blade.

DETAILED DESCRIPTION

Figure 1:
FIG. 1 shows an example of transparent (also known as translucent) paper. This paper may be prepared as disclosed herein to create a product that is permeated with silk.

Except as otherwise expressly provided herein, each of the following terms shall have the meaning set forth below. Additional definitions are set forth throughout the application. Unless defined otherwise, all technical and scientific terms used herein have the meaning as commonly understood by one of ordinary skill in the art.

Units, prefixes, and symbols are denoted in their Système International de Unites (SI) accepted form. Numeric ranges are inclusive of the numbers defining the range. The disclosure provided herein are not limitations of the various aspects of the application, which may be by reference to the specification as a whole. Unless defined otherwise, all technical and scientific terms used herein have the same meaning as commonly understood by one of ordinary skill in the art to which this disclosure is related. For example, Juo, "The Concise Dictionary of Biomedicine and Molecular Biology", 2nd ed., (2001), CRC Press; "The Dictionary of Cell & Molecular Biology", 5th ed., (2013), Academic Press; and "The Oxford Dictionary Of Biochemistry And Molecular Biology", Cammack et al. eds., 2nd ed, (2006), Oxford University Press, provide those of skill in the art with a general dictionary for many of the terms used in this disclosure.

The articles "a" or "an" refer to "one or more" of any recited or enumerated component.

The terms "about" or "comprising essentially of" refer to a value or composition that is within an acceptable error range for certain value or composition as determined by one of ordinary skill in the art, which will depend in part on how the value or composition is measured or determined, i.e., the limitations of the measurement system. For example, "about" or "comprising essentially of" may mean within 1 or more than 1 standard deviation per the practice in the art. Alternatively, "about" or "comprising essentially of" may mean a range of up to 10% (i.e., ±10%). For example, about 3 mg may include any number between 2.7 mg and 3.3 mg (for 10%). With respect to biological systems or processes, the terms may mean up to an order of magnitude or up to 5-fold of a value. When certain values or compositions are provided in the application and claims, unless otherwise stated, the meaning of "about" or "comprising essentially of" include an acceptable error range for that value or composition. Any concentration range, percentage range, ratio range, or integer range includes the value of any integer within the recited range and, when appropriate, fractions thereof (such as one-tenth and one-hundredth of an integer), unless otherwise indicated.

Unless specifically stated or obvious from context, as used herein, the term "or" is understood to be inclusive and covers both "or" and "and". The term "and/or" refer to each of the two specified features or components with or without the other. Thus, the term "and/or" as used in a phrase such as "A and/or B" herein is intended to include "A and B," "A or B," "A" (alone), and "B" (alone). Similarly, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

The terms "e.g.," and "i.e." are used merely by way of example, without limitation intended, and not be construed as referring only those items explicitly enumerated in the specification.

The terms "or more", "at least", "more than", and the like, e.g., "at least one" include but not be limited to at least 1, 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more than the stated value. Also included is any greater number or fraction in between. The term "no more than" includes each value less than the stated value. For example, "no more than 100" includes 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, and 0. Also included is any lesser number or fraction in between.

The terms "plurality", "at least two", "two or more", "at least second", and the like include but not limited to at least 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more. Also included is any greater number or fraction in between.

Throughout the specification the word "comprising," or variations such as "comprises" or "comprising," is understood to imply the inclusion of a stated element, integer or step, or group of elements, integers or steps, but not the exclusion of any other element, integer or step, or group of elements, integers or steps. It is understood that wherever aspects are described herein with the language "comprising," otherwise analogous aspects described in terms of "consisting of" and/or "consisting essentially of" are also provided. The term "consisting of" excludes any element, step, or ingredient not specified in the claim. *In re Gray*, 53 F.2d 520, 11 USPQ 255 (CCPA 1931); *Ex parte Davis*, 80 USPQ 448, 450 (Bd. App. 1948) ("consisting of" defined as "closing the claim to the inclusion of materials other than those recited except for impurities ordinarily associated therewith"). The term "consisting essentially of" limits the scope of a claim to the specified materials or steps "and those that do not materially affect the basic and novel characteristic(s)" of the claimed invention.

Unless specifically stated or evident from context, as used herein, the term "about" refers to a value or composition that is within an acceptable error range for the particular value or composition as determined by one of ordinary skill in the art, which will depend in part on how the value or composition is measured or determined, i.e., the limitations of the measurement system. For example, "about" or "approximately" may mean within one or more than one standard deviation per the practice in the art. "About" or "approximately" may mean a range of up to 10% (i.e., ±10%). Thus, "about" may be understood to be within 10%, 9%, 8%, 7%, 6%, 5%, 4%, 3%, 2%, 1%, 0.5%, 0.1%, 0.05%, 0.01%, or 0.001% greater or less than the stated value. For example, about 5 mg may include any amount between 4.5 mg and 5.5 mg. Furthermore, particularly with respect to biological systems or processes, the terms may mean up to an order of magnitude or up to 5-fold of a value. When particular values or compositions are provided in the instant disclosure, unless otherwise stated, the meaning of "about" or "approximately" should be assumed to be within an acceptable error range for that particular value or composition.

As described herein, any concentration range, percentage range, ratio range or integer range is to be understood to be inclusive of the value of any integer within the recited range and, when appropriate, fractions thereof (such as one-tenth and one-hundredth of an integer), unless otherwise indicated.

Silk Fibroin

Silk fibroin is a structural protein that may be produced and extracted from silkworm, spiders, or other insects. It may also be otherwise generated synthetically, transgenically and other genetically engineered silks (e.g., silks from bacteria, yeast, mammalian cells, transgenic animals, or transgenic plants). In some embodiments, silk fibroin may be derived from other sources such as spiders, other silkworms, bees, and bioengineered variants thereof. In some embodiments, silk fibroin may be extracted from a gland of silkworm or transgenic silkworms. In some embodiments, silk fibroin is free, or essentially free of sericin, i.e., silk fibroin is a substantially sericin-depleted silk fibroin. Any type of silk fibroin may be used according to aspects of the present disclosure.

Silk fibroin is naturally produced by species such as, without limitation, *Bombyx mandarina, Bombyx mori, Bombyx sinesis, Anaphe moloneyi, Anaphe panda, Anaphe reticulate, Anaphe ambrizia, Anaphe carteri, Anaphe venata, Anapha infracta, Antheraea assamensis, Antheraea assama, Antheraea mylitta, Antheraea pernyi, Antheraea yamamai, Antheraea polyphemus, Antheraea oculea, Anisota senatoria, Apis mellifera, Araneus diadematus, Araneus cavaticus, Automeris io, Atticus atlas, Copaxa multifenestrata, Coscinocera hercules, Callosamia promethea, Eupackardia calleta, Eurprosthenops australis, Gonometa postica, Gonometa rufobrunnea, Hyalophora cecropia, Hyalophora euryalus, Hyalophora gloveri, Miranda auretia, Nephila madagascarensis, Nephila clavipes, Pachypasa otus, Pachypasa atus, Philosamia ricini, Pinna squamosa, Rothschildia hesperis, Rothschildia lebeau, Samia cynthia,* and *Samia ricini,* and *Tetragnatha versicolor*. Silk fibroin's unique properties are derived from its structure, consisting of hydrophobic blocks separated by hydrophilic spacers. In its natural state, silk fibroin is organized in beta-sheets, which are formed by highly ordered crystalline regions alternated by amorphous regions. This unique structure results in high levels of strength and toughness for silk fibroin-based materials. The wide range of forms into which silk fibroin solution may be processed make it attractive for several high-tech applications, including scaffolds for tissue engineering, bone screws for fixation, and drug depots for therapeutic delivery.

Among other insects, the *Bombyx mori* silkworm starts its life in a cocoon. A single cocoon may be made up of hundreds of meters of silk. The cocoon itself is made up largely by two proteins: fibroin and sericin. With the other component parts, the fibroin helps regulate gas diffusion in and out of the cocoon. Similarly, such regulation is achievable with silk fibroin-based materials. This is applicable to extending the shelf-life of perishables given that the main modes of spoilage relate to oxidation, degradation, and dehydration. When applied to agriculture, the tunability of silk fibroin allows for its versatility of application across different produce types. Silk fibroin forms polymeric coatings with varying degree of solubility and breathability. Fine-tuning is enabled by different production parameters such as concentration, shear force, additives, temperature, and postprocessing. By tuning these parameters, silk-fibroin structural organization may be controlled. Structural differences ultimately affect crystallinity, elasticity, solubility and porosity which in turn alter the gas and water diffusion behavior, as well as reduce microbial growth rates.

The starting material for fibroin may be cocoons, cocoon filaments, raw silk, silk fabrics, silk yarn, degummed silk, any other partially cleaned silk, etc. This may also include short fragments of raw or sericin-depleted silk. In some embodiments, the silk fibroin is in a powder. In some embodiments, the silk fibroin is in a solution. In some embodiments, the silk solutions are as described in U.S. Patent Application Publication No. US 2020-0178576 A1, incorporated herein by reference in its entirety. The silk compositions used for the silk films and silk-coated packaging materials contain at least one silk protein, including fibroin, fibroin-related protein, or modified fibroin protein. The silk protein in these compositions may range from about 0.1% (w/w) to about 1% (w/w) from about 1% (w/w) to about 5% (w/w), from about 5% (w/w) to about 10% (w/w), from 10% (w/w) to about 100% (w/w), from about 20% (w/w) to about 95% (w/w), from about 30% (w/w) to about 90% (w/w), from about 40% (w/w) to about 85% (w/w), from about 50% (w/w) to about 80% (w/w), from about 60% (w/w) to about 99% (w/w), from about 70% (w/w) to about 99% (w/w), from about 80% (w/w) to about 99% (w/w), from about 80% (w/w) to about 100% (w/w), from about 90% (w/w) to about 99% (w/w), or from about 80% (w/w) to about 90% (w/w). In an embodiment, the percent silk in the composition is less than 60%. In an embodiment, the percent silk (w/w) in the composition is less than 25%. In an embodiment, the percent silk in the composition is less than 20%. In an embodiment, the percent silk in the composition is less than 19%. In an embodiment, the percent silk in the composition is less than 18%. In an embodiment, the percent silk in the composition is less than 17%. In an embodiment, the percent silk in the composition is less than 16%. In an embodiment, the percent silk in the composition is less than 15%. In an embodiment, the percent silk in the composition is less than 14%. In an embodiment, the percent silk in the composition is less than 13%. In an embodiment, the percent silk in the composition is less than 12%. In an embodiment, the percent silk in the composition is less than 11%. In an embodiment, the percent silk in the composition is less than 10%. In an embodiment, the percent silk in the composition is less than 9%. In an embodiment, the percent silk in the composition is less than 8%. In an embodiment, the percent silk in the composition is less than 7%. In an embodiment, the percent silk in the composition is less than 6%. In an embodiment, the percent silk in the composition is less than 5%. In an embodiment, the percent silk in the composition is less than 4%. In an embodiment, the percent silk in the composition is less than 3%. In an embodiment, the percent silk in the composition is less than 2%. In an embodiment, the percent silk in the composition is less than 1%. In an embodiment, the percent silk in the composition is less than 0.9%. In an embodiment, the percent silk in the composition is less than 0.8%. In an embodiment, the percent silk in the composition is less than 0.7%. In an embodiment, the percent silk in the composition is less than 0.6%. In an embodiment, the percent silk in the composition is less than 0.5%. In an embodiment, the percent silk in the composition is less than 0.4%. In an embodiment, the percent silk in the composition is less than 0.3%. In an embodiment, the percent silk in the composition is less than 0.2%. In an embodiment, the percent silk in the composition is less than 0.1%. Higher or lower silk protein content may also be possible.

The solvent content in the silk compositions may range from about 0% (w/w) to about 60% (w/w), from about 0.5% (w/w) to about 50% (w/w), from about 1% (w/w) to about 40% (w/w), from about 1% (w/w) to about 30% (w/w), from about 1% (w/w) to about 20% (w/w), from about 1% (w/w) to about 15% (w/w), from about 1% (w/w) to about 12% (w/w), from about 2% (w/w) to about 10% (w/w), from about 3% (w/w) to about 9% (w/w), from about 4% (w/w) to about 8% (w/w), from about 5% (w/w) to about 7% (w/w), from about 6% (w/w) to about 12% (w/w), from about 5% (w/w) to about 10% (w/w), or from about 5% (w/w) to about 15% (w/w). Higher or lower solvent content may also be possible. In certain embodiments, the silk used for generation of the present compositions is substantially depleted of its sericin content (i.e., less than about 4% (w/w) residual sericin in the final extracted silk). Alternatively, higher concentrations of residual sericin may be left on the silk following extraction or the extraction step may be omitted. In aspects of this embodiment, the sericin-depleted silk fibroin has, e.g., less than about 1% (w/w), less than about 2% (w/w), less than about 3% (w/w), less than about 4% (w/w), less than about 5% (w/w), less than about 10% (w/w), less than about 15% (w/w), about 1% (w/w) to about 2% (w/w), about 1% (w/w) to about 3% (w/w), or about 1% (w/w) to about 4% (w/w) residual sericin.

The silk fibroin may be modified for different applications and/or desired mechanical or chemical properties (e.g., to facilitate formation of a gradient of an additive (e.g., an active agent) in silk fibroin-based materials). One of skill in the art may select appropriate methods to modify silk fibroins, e.g., depending on the side groups of the silk fibroins, desired reactivity of the silk fibroin and/or desired charge density on the silk fibroin. In one embodiment, modification of silk fibroin may use the amino acid side chain chemistry, such as chemical modifications through covalent bonding, or modifications through charge-charge interaction. Exemplary chemical modification methods include, but are not limited to, carbodiimide coupling reaction, diazonium coupling reaction, avidin-biotin interaction and pegylation with chemically-active or activated derivatives of the PEG polymer. Silk fibroin may also be modified through gene modification to alter functionalities of the silk protein. For instance, the silk fibroin may be genetically modified, which may provide for further modification of the silk such as the inclusion of a fusion polypeptide comprising a fibrous protein domain and a mineralization domain, which may be used to form an organic-inorganic composite. Additionally, the silk fibroin-based material may be combined with a chemical that affects flexibility of the material.

Figure 15:
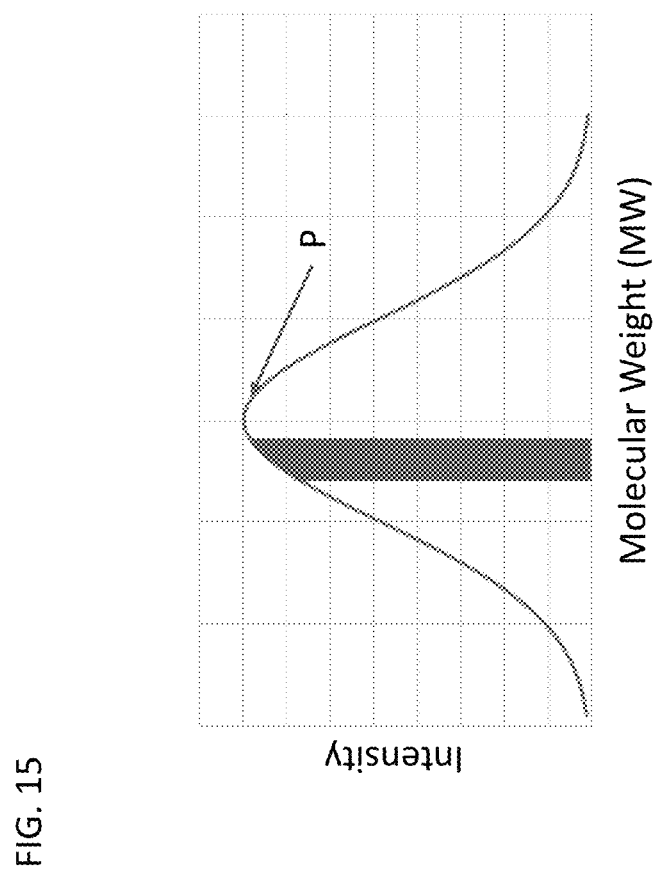
FIG. 15 shows an exemplary graph of the molecular weights (MW) of silk fibroin fragments in an exemplary silk film and/or coating.
Figure 16:
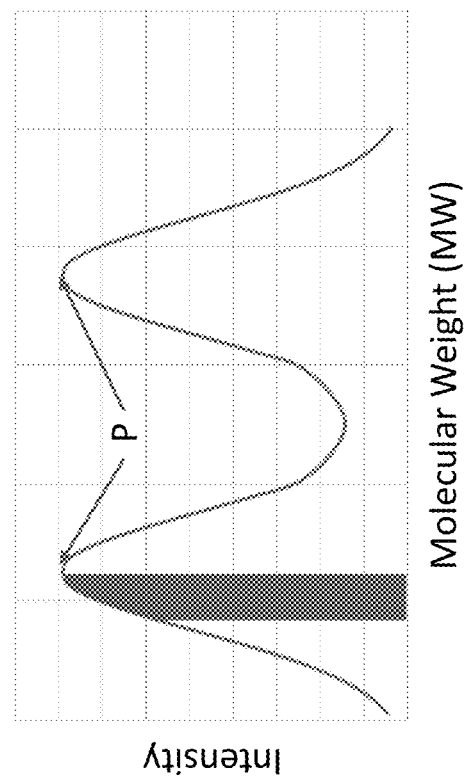
FIG. 16 shows an exemplary graph of the molecular weights (MW) of silk fibroin fragments in an exemplary silk film and/or coating.

In some embodiments, the silk fibroin comprises silk fibroin monomers, polymers, and/or fragments. As used herein, the term silk fibroin fragments also includes assemblies of silk fibroin fragments. In some embodiments, the silk film and/or coating comprises a specific percentage (weight/volume) of silk fibroin fragments. In some embodiments, a specific percentage of the silk fibroin fragments have a specific molecular weight (MW). In this context, molecular weight (MW) refers to the molecular weight of individual silk fibroin fragments in a silk film and/or coating, and is not to be confused with weight average molecular weight ($M_w$). To measure the various characteristics of the silk, one could use any industry appropriate method or device. In one example, gel permeation chromatography (GPC) could be used to acquire the molecular weight (MW) of silk fibroin fragments and the weight average molecular weight ($M_w$) of the silk. As an illustrative example, FIGS. 15 and 16 illustrate two different exemplary graphs of the molecular weights of silk fibroin fragments present in a silk film and/or coating. The X axis represents molecular weight (MW), and the Y axis represents intensity (e.g., the number of silk fibroin fragments with the same molecular weight). The blue bar illustrates a molecular weight (MW) range (e.g., 50 kDa to 100 kDA) that includes a certain percentage (e.g. 10%) of the fibroin fragments in the silk film and/or coating. The Figures also include peaks (P), for example FIG. 15 has one peak and FIG. 16 has two peaks. As a further example, a graph of the molecular weights (MW) of a silk film and/or coating could include more than two peaks. For the purposes of this disclosure, the number of peaks is not limiting and does not impact the percentages of silk fibroin fragments with a specific molecular weight (MW) as discussed herein.

In some aspects, more than about 1% of the silk fibroin fragments have a molecular weight (MW) above 300 kilodaltons (kDa), more than about 5% of the silk fibroin fragments have a molecular weight (MW) above 300 kDa, more than about 10% of the silk fibroin fragments have a molecular weight (MW) above 300 kDa, more than about 15% of the silk fibroin fragments have a molecular weight (MW) above 300 kDa, more than about 20% of the silk fibroin fragments have a molecular weight (MW) above 300 kDa, more than about 25% of the silk fibroin fragments have a molecular weight (MW) above 300 kDa, more than about 30% of the silk fibroin fragments have a molecular weight (MW) above 300 kDa, more than about 35% of the silk fibroin fragments have a molecular weight (MW) above 300 kDa, more than about 40% of the silk fibroin fragments have a molecular weight (MW) above 300 kDa, more than about 45% of the silk fibroin fragments have a molecular weight (MW) above 300 kDa, more than about 50% of the silk fibroin fragments have a molecular weight (MW) above 300 kDa, more than about 55% of the silk fibroin fragments have a molecular weight (MW) above 300 kDa, more than about 60% of the silk fibroin fragments have a molecular weight (MW) above 300 kDa, more than about 65% of the silk fibroin fragments have a molecular weight (MW) above 300 kDa, more than about 70% of the silk fibroin fragments have a molecular weight (MW) above 300 kDa, more than about 75% of the silk fibroin fragments have a molecular weight (MW) above 300 kDa, more than about 80% of the silk fibroin fragments have a molecular weight (MW) above 300 kDa, more than about 85% of the silk fibroin fragments have a molecular weight (MW) above 300 kDa, more than about 90% of the silk fibroin fragments have a molecular weight (MW) above 300 kDa, more than about 95% of the silk fibroin fragments have a molecular weight (MW) above 300 kDa.

In some aspects, more than about 1% of the silk fibroin fragments have a molecular weight (MW) above 400 kDa, more than about 5% of the silk fibroin fragments have a molecular weight (MW) above 400 kDa, more than about 10% of the silk fibroin fragments have a molecular weight (MW) above 400 kDa, more than about 15% of the silk fibroin fragments have a molecular weight (MW) above 400 kDa, more than about 20% of the silk fibroin fragments have a molecular weight (MW) above 400 kDa, more than about 25% of the silk fibroin fragments have a molecular weight (MW) above 400 kDa, more than about 30% of the silk fibroin fragments have a molecular weight (MW) above 400 kDa, more than about 35% of the silk fibroin fragments have a molecular weight (MW) above 400 kDa, more than about 40% of the silk fibroin fragments have a molecular weight (MW) above 400 kDa, more than about 45% of the silk fibroin fragments have a molecular weight (MW) above 400 kDa, more than about 50% of the silk fibroin fragments have a molecular weight (MW) above 400 kDa, more than about 55% of the silk fibroin fragments have a molecular weight (MW) above 400 kDa, more than about 60% of the silk fibroin fragments have a molecular weight (MW) above 400 kDa, more than about 65% of the silk fibroin fragments have a molecular weight (MW) above 400 kDa, more than about 70% of the silk fibroin fragments have a molecular weight (MW) above 400 kDa, more than about 75% of the silk fibroin fragments have a molecular weight (MW) above 400 kDa, more than about 80% of the silk fibroin fragments have a molecular weight (MW) above 400 kDa, more than about 85% of the silk fibroin fragments have a molecular weight (MW) above 400 kDa, more than about 90% of the silk fibroin fragments have a molecular weight (MW) above 400 kDa, more than about 95% of the silk fibroin fragments have a molecular weight (MW) above 400 kDa.

In some aspects, between about 1% and about 30% of the silk fibroin fragments have a molecular weight (MW) above 300 kDa, between about 10% and about 30% of the silk fibroin fragments have a molecular weight (MW) above 300 kDa, between about 10% and about 50% of the silk fibroin fragments have a molecular weight (MW) above 300 kDa, between about 10% and about 75% of the silk fibroin fragments have a molecular weight (MW) above 300 kDa, between about 10% and about 95% of the silk fibroin fragments have a molecular weight (MW) above 300 kDa, between about 15% and about 30% of the silk fibroin fragments have a molecular weight (MW) above 300 kDa, between about 30% and about 50% of the silk fibroin fragments have a molecular weight (MW) above 300 kDa, between about 50% and about 90% of the silk fibroin fragments have a molecular weight (MW) above 300 kDa, between about 50% and about 75% of the silk fibroin fragments have a molecular weight (MW) above 300 kDa, between about 60% and about 75% of the silk fibroin fragments have a molecular weight (MW) above 300 kDa, between about 75% and about 95% of the silk fibroin fragments have a molecular weight (MW) above 300 kDa, between about 80% and about 95% of the silk fibroin fragments have a molecular weight (MW) above 300 kDa.

In some aspects, between about 1% and about 60% of the silk fibroin fragments have a molecular weight (MW) above 400 kDa, between about 1% and about 20% of the silk fibroin fragments have a molecular weight (MW) above 400 kDa, between about 1% and about 30% of the silk fibroin fragments have a molecular weight (MW) above 400 kDa, between about 5% and about 20% of the silk fibroin fragments have a molecular weight (MW) above 400 kDa, between about 30% and about 60% of the silk fibroin fragments have a molecular weight (MW) above 400 kDa, between about 35% and about 55% of the silk fibroin fragments have a molecular weight (MW) above 400 kDa, between about 35% and about 75% of the silk fibroin fragments have a molecular weight (MW) above 400 kDa, between about 35% and about 85% of the silk fibroin fragments have a molecular weight (MW) above 400 kDa, between about 50% and about 85% of the silk fibroin fragments have a molecular weight (MW) above 400 kDa, between about 55% and about 80% of the silk fibroin fragments have a molecular weight (MW) above 400 kDa, between about 70% and about 90% of the silk fibroin fragments have a molecular weight (MW) above 400 kDa.

In some embodiments, the fibroin fragments comprise a weight average molecular weight ($M_w$) from about 1 kDa to about 600 kDa. In some embodiments, the molecular weight (MW) of the silk fibroin fragments may range from about 10 kDa to about 1000 kDa. In some embodiments, the silk films and/or coating comprise silk fibroin compositions as described in U.S. Patent Application Publication No. 2020-0178576 A1, incorporated herein by reference in its entirety.

Silk Films and Packaging Coatings

Silk films and packaging coatings may be designed for different storage conditions or products of interest. One embodiment is directed to a packaging composition wherein the silk film is transparent. The film may be flexible or it may be rigid.

In some embodiments, the silk film is a pure silk protein film. In some embodiments, the silk film is a composite. In some aspects, the silk film may be comprised of silk fibroin. The silk fibroin may be isolated from silk sericin and the protein coat through the Ajisawa method or through other methods using water and salts, including chaotropic salts. In some embodiments, silk fibroin may be prepared according to the method described in Marelli, B., Brenckle, M., Kaplan, D. et al. Silk Fibroin as Edible Coating for Perishable Food Preservation. *Sci Rep* 6, 25263 (2016). https://doi.org/10.1038/srep25263, incorporated herein by reference in its entirety. In some embodiments, the silk fibroin may be as described in US 2020-0178576 A1, incorporated herein by reference in its entirety.

The silk fibroin may be a dried powder. In some further aspects, the silk fibroin may be in liquid form. In some aspects, the solution may comprise the silk fibroin powder mixed with a solvent. In some aspects, the solvent may be a liquid. In some further aspects, the solvent may be an acid with a pH under 6.0. Alternatively, the solvent may be an alcohol or water. In other aspects, the solvent may be acetic acid.

In some aspects, the silk fibroin powder or solution may be in a mixture containing an additive. In some embodiments, the additives may be plasticizers. In some embodiments, the additives may be surfactants. In some embodiments, the additive may be sorbitol, glycerol, xylitol, polyethylene glycol, mannitol, isomalt, sugars, collagen, cellulose, or lipids. In some embodiments, the additives may be pore fillers, including for example, food residuals (e.g., rice husks, corn husks, chitosan, citrus limetta peels, bran filler), clays, cellulose (e.g., microfibrillated, hardwood fibers, softwood fibers, bamboo, wheat), soy, and the like. In some embodiments, the liquid solvent for the silk fibroin may contain an additive. In some embodiments, both the silk fibroin powder mixture and the liquid solvent may contain additives. In some aspects, the silk fibroin may be emulsified with the additive prior to being mixed into the solution. For example, liquid silk fibroin may be mixed or dry-blended with the additive prior to being mixed into the solution. In some aspects, the additive may be at least one of a sugar, a plasticizer (e.g., polyethylene glycol, propyleneglycol, glycerol and sorbitol), or a crosslinking agent. For example, the sugar additive may be a sugar-ol, a poly-ol, or a hygroscopic polymer (e.g., polyethylene glycol). In other examples, if the sugar additive is a crosslinking agent, the crosslinking agent may be photoreactive. Specifically, the crosslinking agent may be, for example, one or more of horseradish peroxidase, lysyl oxidase, disuccinimidyl suberate, disuccinimidyl glutarate, N-hydroxysuccinimide ester, or an aryl azide. In some alternative aspects, the additive may include one or more of a metal, or an enzyme. For example, the metal may include one or more of an alkali metal, an alkaline earth metal, or a transition metal. Alternatively, in other examples, the additive may be an enzyme (i.e., an RNase or a DNase), a fatty acid, a sugar (e.g., an alcohol sugar), or a mineral. For example, the enzyme may include erepsin maltase, lactase, sucrase, disaccharidases, lingual lipase, lysozymes, salivary amylase, pepsin, gastric lipase, other lipases, hydrochloric acids, mucins, gastrins, trypsinogen, carboxypeptidase, elastases, papain, and the like.

In some other alternative aspects, the additive may be at least one of a coloring agent, a chelator, a ligand, an antimicrobial (e.g., chitosan, zinc oxide and titanium oxide nanoparticles, silver, active carbon), a filler, a scent, a bio-based sensor (e.g., colorimetric sensor), a plasticizer, an ultraviolet resistant compound (e.g., titania, boron nitride, and zinc oxide), a foaming agent, and/or a flavor. In some embodiments, the additive and the silk protein form a composite that has improved properties (e.g., increased strength and stiffness) than silk protein alone. In some embodiments, the composite is a bio-nanocomposite. In some embodiments, the additive further serves as a $CO_2$ scavenger/emitter, oxygen scavenger, ethylene scavenger, aroma emitter/odor absorber, time-temperature sensor, ripeness indicator, biosensor, and/or for sustained release of antioxidants during storage. In one embodiment, the coloring agent may be allura red, Ponceau 3R, amaranth, erythrosine, indigotine, Light Green SF, Naphthol yellow, Orange 1, quinoline yellow, tartrazine, an E1 suit (e.g., E100, E161b, etc.), an anthocyanin, a betacyanin, a carotenoid, or a phenolic. In other examples, the chelator may be ethylenediaminetetraacetic acid (EDTA), transferrin, or desferrixoxamine. In other examples, the antimicrobial may be acetic acid, benzoic acid, natamycin, nisin, nitrate, nitrite, propionic acid, sorbic acid, sulfite, or sulfur dioxide. In other examples, the filler may be cellulose. In other alternative embodiments, the additive may be at least one of a marine oil, prebiotic, probiotic, encapsulated vitamin, phytochemical, bioavailable flavonoid, vitamin, a nutrient, an antioxidant, and a protein or a natural or synthetic amino acid. A nutrient may be defined as a mineral, protein, carbohydrate, fat, Q10, glutathione, lithium, probiotic, glycine, DHA, flavonoid, or others. An antioxidant may include vitamins C and E, selenium, carotenoids, thiols, catalase, superoxide dismutase, uric acid, and ubiquinol. In some embodiments, the protein comprises wheat gluten, corn zein, soy protein, pea protein, whey protein, casein, egg white, keratin, collagen, gelatin, caseinates, or a myofibrillar protein. In some further alternative embodiments, the additive may be at least one of a green tea extract, a rosemary extract, a phenolic antioxidant, catechin, acerola, tocopherol, chamomile extract, *Malphigia emarginata, Camellia sinensis*, epicatechin, epigallocatechin, gallochatechin, epigallocatechin gallates, vitamin A, vitamin E, and/or vitamin C. In some embodiments, the additive is an essential oil. In some embodiments, the additive comprises clay nanoparticles. In some embodiments, the additive is silver nanoparticles. In some aspects, the additive may be mixed with an accelerant or an excipient. For example, the additive may be mixed with polyethylene glycol or xylitol. In some further aspects, the additive may be emulsified with the accelerant or excipient and mixed into a silk fibroin solution.

Substrates

The silk may be applied to or mixed with any substrate. In some embodiments, the substrate is a biodegradable material. In some embodiments, the substrate is bio-based (biodegradable or non-degradable). In some embodiments, the substrate is a paper. In some embodiments, the substrate is a fiber (e.g., paper fiber). In some embodiments, the substrate comprises another protein (e.g., zein, gluten, whey protein, soy protein and caseinates). In some embodiments, the substrate is cardboard. In some embodiments, the substrate is a metal, paper, glass, or plastic (e.g., rigid, flexible, bioplastics). In some embodiments, the metal is aluminum, tin, or steel (tin-coated steel, or tin-free steel). In some embodiments, the paper (e.g., corrugated boxes, milk cartoons, folding cartons, paper plates and cups, bags and sacks, wrapping paper) is Kraft paper, sulphite paper, greaseproof paper, glassine, or parchment paper. In some embodiments, the substrate is paperboard (e.g., white board, solid board, chipboard, and fibreboard). In some embodiments, the paper comprises a wax. In some embodiments, the substrate is or comprises a wax. In some embodiment, the wax is natural (e.g., bees wax, soywax or candelilla wax). In some embodiments, the wax is petroleum-based (e.g., paraffin). In some embodiments, the substrate is a paper laminate. In some embodiments, the substrate is glass. In some embodiments, the substrate is plastic. In some embodiments, the plastic is thermoset plastic. In some embodiments, the substrate is thermoplastic. In some embodiments, the plastic comprises PP, LDPE, LLDPE, and/or PET. In some embodiments, the substrate comprises polyolefins (e.g., polyethylene and polypropylene) and/or polyester (e.g., polyethylene terephthalate). In some embodiments, the substrate is a polyester-polyethylene laminate. In some embodiments, the substrate is a bio-based polymer. In some embodiments, the substrate is a bio-based polymer selected from (i) polymers obtained directly from biomass including proteins (e.g., zein, gluten, whey protein, soy protein and caseinates) and polysaccharides (e.g., cellulose, starch, and chitosan); (ii) synthetic polymers from biomass derived or oil based monomers including polyactic acid (PLA), ethylene-vinyl alcohol (EVOH), polyvinyl alcohol (PVA) and polycaprolactones (PCL); and (iii) polymers developed by genetically modified or natural microorganisms such as bacterial cellulose or polyhydroxyalcanoates (PHAs). In some embodiments, the biodegradable material comprises starch, cellulose, cellulose nanocrystals and cellulose based polymers (polysaccharides) (e.g., cellulose acetate, and cellulose with lignin), chitosan, protein, Polyhydroxyalkanoates (PHA), polyhydroxybuterate (PHB), and a copolymer of PHB and valeric acid (PHB/V), bacterial cellulose, polyvinyl alcohol, polylactide, polyglycolide, Poly(e-caprolactone) (PCL), Poly(butylene succinate) (PBS), Poly(trimethylene terephthalate) (PTT), and/or Poly(butylene adipate-co-terephthalate) (PBAT). In some embodiments, the substrate is polylactic acid. In some embodiments, the substrate is stretch film, bundling film, or shrink film. In some embodiments, the silk is used in active packaging.

Methods of Application of the Silk Protein to a Substrate

In some embodiments, the silk protein may be used to coat a substrate. In some embodiments, the substrate is a packaging substrate. In some embodiments, the coating of a packaging substrate with silk improves barrier properties while maintaining recyclability or compostability in both primary and secondary packaging applications. The composting degradation rate of the material stored or held within the packaging, such as a food composition (e.g., non-perishable foods, fresh foods, and other perishable food products, and the like), may be controlled based on crystallinity, molecular weight, and/or porosity of the silk used to create a film or coating on the packaging. Silk is not likely to impede paper repulping. General paper repulping chemicals (e.g., sodium hydroxide) may degrade silk fibroin.

Silk fibroin may be manufactured with particular molecular weights and crystallinity ranges to be readily compostable and naturally degraded by proteolytic enzymes found in, for example, animals, plants, fungi, and bacteria. In addition, the rate of degradation may be controlled based on intrinsic characteristics to the silk fibroin itself, including but not limited to crystallinity, molecular weight, and porosity. When creating a silk coating for substrates that are also compostable, a silk coating on that same substrate would be similarly compostable. In some aspects, a silk coated substrate may require different degradation methods or different degradation rates to fully compost. In other aspects, the tunability (e.g. controlling crystallinity, molecular weight, and/or porosity) of silk fibroin permits controllable biodegradability rates, including the ability to slow down or speed up the biodegradability of the silk fibroin. In one aspect, the silk fibroin may have a percent crystallinity in the range of about 5% to about 95%, or from about 10% to about 90%, or from about 20% to about 80%, or from about 20% to about 70%, or from about 20% to about 60%, or from about 20% to about 50%, or from about 20% to about 40%, or from about 25% to about 80%, or from about 25% to about 70%, or from about 25% to about 60%, or from about 25% to about 50%, or from about 25% to about 40%, or from about 30% to about 80%, or from about 30% to about 70%, or from about 30% to about 60%, or from about 30% to about 50%, or from about 30% to about 40%, or from about 40% to about 80%, or from about 40% to about 70%, or from about 40% to about 60%, or from about 40% to about 50%.

Specific to paper and pulp processes, the chemicals used to break down paper materials and repulp to create new material are similar to the chemicals used to break down silk fibroin, which is manufactured to be readily compostable. For example, sodium hydroxide and other basic materials will degrade such silk fibroin at a similar rate and method to that of conventionally repulped paper materials. Throughout a pulping process, it would not be expected that a silk coated paper material would require additional steps or a significantly altered process to achieve the same repulping efficiency as with the same uncoated paper material.

The silk may be applied to a substrate by any method. In some embodiments, the silk is applied to the substrate by lamination, infusion (e.g., infusion of silk into foams, injection molds, paper pulp, or any other material used to make packaging), to fibrous structures (e.g., applying silk to material prior to weaving it into a fabric or to cellulose), impregnation (e.g. submersion), and/or coating (e.g., airbrush, doctor blade, dip coating, surface coating). In some embodiments, the silk is applied to a substrate by roller, gravure coating, comma rod, air knife, spray coating, curtain coating, or slot coating. In some embodiments, the silk is deposited onto a substrate and then dried via, for example, air-drying, freeze-drying, vacuum drying, or heat-drying. In some aspects, the silk solution may be deposited onto a substrate via spray-coating. The substrate may be silicone and one may peel off the silk film from a rubberized material. The silk solution may also be used to make free-standing silk films. In this example, the silk solution is left to dry until only the silk film remains. The free-standing silk film may be applied as a coating, sealed around an object to create a package, used as a film insert to packaging, combined with an adhesive to adhere to packaging. Alternatively, the solution may be deposited onto a substrate via dip-coating. In some aspects, the silk may be applied by electrospinning.

In some aspects, the substrate may undergo pre-treatment, by for example being exposed to a basic solution and then dried prior to application of the silk solution. By a further example, a pre-treatment could include adding a binder and/or adhesive to the substrate to improve the abrasion resistance or adhesion of the silk solution. Similarly, the surface of the substrate could be roughened by mechanical means to improve adhesion of the silk solution. In another aspect, the pre-treatment may include treating the substrate with an oxidizing agent (e.g. acid) to tune the surface energy of the substrate to improve the wetting characteristics of the silk solution and improve adhesion of the silk. Similarly, the substrate could be treated with low temperature plasma to improve the wetting characteristics of the silk solution and improve adhesion of the silk solution. In another aspect, the pre-treatment could include coating the substrate with a pore filler or surface roughness modifier (e.g., nanofibrillated cellulose) to tune the surface texture of the substrate to improve the adhesion of the silk solution.

In some aspects, the silk coating applied to a substrate may undergo post-treatment to improve the properties of the silk coating, including treatment with alcohol (e.g., methanol, ethanol, isopropanol). In another aspect, the post-treatment could include ultraviolet exposure to cross-link the silk coating or heat treatment to activate a foaming agent in the silk coating. In some aspects, the silk may or may not be annealed after or before deposition, including by water annealing.

In some further aspects, the substrate may include multiple layers of silk. In one embodiment, the substrate may be sprayed with silk solution, dried, and then sprayed once more. This may happen any number of times to add thickness and additional layers. In some further aspects, the substrate may comprise multiple layers, with each layer serving a function. For example, the substrate may be coated with silk solution. Then, the silk solution-coated substrate may be itself coated by another coating that is hydrophobic or water-tight such that water may not permeate the outer layer and reach the inner silk layer. In another aspect, multiple different substrates may be coated with silk and combined to form a single substrate with alternating layers of silk coating and substrate. For example, a paper product could have alternating layers of paper and silk coating that form a single product. In some further aspects, a tablet-coating may be utilized, where the silk is coated while in an industrially-relevant drum. Tablet coating may additionally be utilized, as well as film-coating. The film may be heated in order to bind to papers or to be used to envelope certain foods or materials. A combination of the processes and methods disclosed above could be used to obtain the desired coating performance on any suitable substrate. In another aspect, free-standing silk films may be created from the silk. As an example, a thin layer of silk solution (e.g., a silk fibroin and solvent) may be placed in a mold (e.g., rubber, silicone, polyethylene) and left to dry. After the solvent evaporates from the solution, a thin silk film would be left on the mold. This free-standing silk film could be used to create packaging or applied via lamination to a substrate.

The silk coating or silk film may be of different thicknesses depending on the desired application or method used to create it. In some aspects, the silk coating or silk film may be uniform in thickness. In some aspects, the silk coating or silk film may not have a uniform thickness. For example, the silk coating may be thinner in some areas due to natural variances caused by the method used to apply the coating (e.g., a spray coating may vary in thickness due to variances during the application process such as spraying one area slightly longer than others resulting in different coating thickness). In other aspects, the thickness may be varied on purpose to create specific barrier properties. In some embodiments the thickness may range from about 10 nm to about 1 mm, from about 10 nm to about 50 nm, from about 50 nm to about 100 nm, from about 100 nm to about 200 nm, from about 100 nm to about 100 µm, from about 200 nm to about 300 nm, from about 300 nm to about 500 nm, from about 500 nm to about 1 µm, from about 1 µm to about 5 µm, from about 5 µm to about 10 µm, from about 10 µm to about 15 µm, from about 10 µm to about 20 µm, from about 10 µm to about 25 μm, from about 10 μm to about 50 μm, from about 10 μm to about 100 μm, from about 15 μm to about 25 μm, from about 15 μm to about 35 μm, from about 15 μm to about 50 μm, from about 20 μm to about 40 μm, from about 20 μm to about 50 μm, from about 25 μm to about 35 μm, from about 25 μm to about 50 μm, from about 25 μm to about 100 μm, from about 30 μm to about 50 μm, from about 30 μm to about 75 μm, from about 40 μm to about 50 μm, from about 40 μm to about 75 μm, from about 50 μm to about 65 μm, from about 50 μm to about 75 μm, from about 50 μm to about 85 μm, from about 50 μm to about 100 μm, from about 100 μm to about 150 μm, from about 100 μm to about 200 μm, from about 100 μm to about 250 μm, from about 150 μm to about 250 μm, from about 100 μm to about 300 μm, from about 100 μm to about 400 μm, from about 100 μm to about 500 μm, from about 200 μm to about 400 μm, from about 200 μm to about 500 μm, from about 400 μm to about 600 μm, from about 500 μm to about 800 μm from, from about 500 μm to about 1 mm, from about 100 μm to about 1 mm.

In an embodiment, the thickness of the silk coating or silk film may have a thickness less than 1 mm. In an embodiment, the thickness of the silk coating or silk film may have a thickness less than 500 μm. In an embodiment, the thickness of the silk coating or silk film may have a thickness less than 300 μm. In an embodiment, the thickness of the silk coating or silk film may have a thickness less than 200 μm. In an embodiment, the thickness of the silk coating or silk film may have a thickness less than 150 μm. In an embodiment, the thickness of the silk coating or silk film may have a thickness less than 100 μm. In an embodiment, the thickness of the silk coating or silk film may have a thickness less than 80 μm. In an embodiment, the thickness of the silk coating or silk film may have a thickness less than 70 μm. In an embodiment, the thickness of the silk coating or silk film may have a thickness less than 60 μm. In an embodiment, the thickness of the silk coating or silk film may have a thickness less than 50 μm. In an embodiment, the thickness of the silk coating or silk film may have a thickness less than 40 μm. In an embodiment, the thickness of the silk coating or silk film may have a thickness less than 30 μm. In an embodiment, the thickness of the silk coating or silk film may have a thickness less than 25 μm. In an embodiment, the thickness of the silk coating or silk film may have a thickness less than 20 μm. In an embodiment, the thickness of the silk coating or silk film may have a thickness less than 15 μm. In an embodiment, the thickness of the silk coating or silk film may have a thickness less than 10 μm. In an embodiment, the thickness of the silk coating or silk film may have a thickness less than 1 μm. In an embodiment, the thickness of the silk coating or silk film may have a thickness less than 500 nm. In an embodiment, the thickness of the silk coating or silk film may have a thickness less than 100 nm.

In some aspects, a substrate may be coated in its entirety or only partially. For example, if the substrate is an enclosed wrapper for a product, it may only be coated on the inside surfaces of the wrapper. As a further example, one surface of a substrate may be coated, e.g., a box may have one surface coated, while the other surfaces may not be coated. In another aspect, the package may only be coated over a portion of a surface of a substrate, for example a surface may only be partially coated such that half of one surface receives a coating. In an embodiment, the substrate may have about 100% of its total surface area coated, or about 80% or more of its total surface area coated, or about 60% or more of its total surface area coated, or about 50% or more of its total surface area coated, or about 40% or more of its total surface area coated, or about 30% or more of its total surface area coated, or about 20% or more of its total surface area coated, or about 10% or more of its total surface area coated. In some aspects, between about 80% to about 100% of the total surface area of a substrate may be coated, or between about 60% to about 80% of the total surface area of a substrate may be coated, or between about 50% to about 80% of the total surface area of a substrate may be coated, or between about 40% to about 60% of the total surface area of a substrate may be coated, or between about 20% to about 40% of the total surface area of a substrate may be coated, or between about 1% to about 20% of the total surface area of a substrate may be coated.

In addition to the ability to mix silk with other substrates to create packaging and coating materials of various types, the mechanical properties of the silk films and coatings may also be tunable by heat treatment, ultraviolet exposure, and gamma radiation. Heated silk films may have higher tensile strength and increased rigidity.

Silk Film and Silk-Coating Properties

The silk films and silk-coated materials have advantageous oxygen Transmission Rate (OTR), Water Vapour Transmission Rate (WVTR), water droplet barrier formation, grease barrier formation, improved sealing properties (both as a thermal insulator and air seal), and/or bacterial barrier formation. In addition, the silk films and silk-coated materials may modify the surface of the material coated, by for example, improving printability of the surface (e.g., increasing adherence of ink or other coloring agents to substrate), modifying friction of the surface by increasing grip or increasing smoothness. The silk films and silk-coated materials may also permit surface modifications (e.g., embossing, debossing, stamping) to the coating. The silk films and silk-coated materials may also impact the mechanical stability when applied, by altering the wet burst strength, tensile resistance, tensile strength, compressive strength, and/or folding stability. As an example, silk when applied to a substrate may decrease the OTR of the substrate by about 5% or more, or by about 10% or more, or by about 20% or more, or by about 30% or more, or by about 40% or more, or by about 50% or more, or by about 60% or more, or by about 70% or more, or by about 80% or more, or by about 90% or more, or by about 95% or more, or by about 99% or more. Likewise, silk applied to a substrate may decrease the WVTR of the substrate by about 5% or more, or by about 10% or more, or by about 20% or more, or by about 30% or more, or by about 40% or more, or by about 50% or more, or by about 60% or more, or by about 70% or more, or by about 80% or more, or by about 90% or more, or by about 95% or more, or by about 99% or more. In one aspect the OTR and WVTR of the substrate may both decrease after application of silk to a substrate. These improvements over a substrate depend on the formulation of the silk applied to the substrate, the substrate's inherent properties, and the specific performance desired.

The silk films or silk-coated materials may be optimized as necessary by changing various properties of the silk, the coating method, and the treatment of the coating to arrive at the desired performance for a specific substrate. The packaging material itself may also be taken into account when optimizing the silk coating. For example, substrates have different characteristics, including surface roughness, porosity, chemical composition, structure, construction method, components. These different characteristics will likely impact what silk is suitable and what application method is ideal. For example, if packaging holds a product that is sensitive to water, the silk coating applied to the packaging may be optimized to decrease the WVTR of the packaging. Similarly, if the product held in the package degrades more quickly if exposed to airflow, the silk coating applied to the packaging may be optimized to decrease the OTR of the packaging. As a further example, lamination may be suitable for a substrate with a rough surface because it ensures a more uniform layer of silk compared to other application methods. In another example, a porous substrate, such as paper, may benefit from submersion to increase the transparency of the paper if that is valued in certain circumstances, such as in a wrapper for a food item. This tunablity enables customization for specific applications for each substrate, and also the products held within the substrate.

Exemplary Packaging Applications

The silk films and silk-coated packaging materials of the disclosure may be used for any purpose. In some embodiments, the silk-containing packaging materials may be used for food compositions, e.g., non-perishable foods, fresh foods, and other perishable food products. In some embodiments, the silk-containing packaging materials may be used for packaging non-perishable food products. In some embodiments, the silk-containing packaging materials may be used for frozen foods, processed foods, beverages, candy, chocolate, or dried foods. The packaging materials may be used to package fruits, juices; milk, cheese, and other dairy products; soft drinks, beer, wine, and other beverages; vegetables, snacks foods, bakery goods, canned foods, cereals, candy, pet foods, meat, fish. They may be used for storage boxes, wrapping paper, wrapping films and other films, lids, caps, reusable containers, pouches, bags, cans, bottles, jars, take-out boxes, jars, corrugated boxes, milk cartoons, folding cartons, paper plates and cups, bags and sacks, wrapping paper, and the like.

EXAMPLES

Example 1

Paper Coating

Materials:
Silk solutions— 5% silk fibroin in water (exemplary, could be between 0.1%-25% silk fibroin)
Paper—food grade (may be woven, unwoven, cardboard, or other materials)
Dipping tray (black food tray, baking sheet)
Drying racks
Procedures for Coating Paper
General Procedure
1. Cut paper to desired dimensions for samples.
   Exemplary dimensions: 6 cm×6 cm
2. Prepare solutions (add dyes or other additives if desired) with ratio of mL per $cm^2$, for example 1-20 mL per 6 $cm^2$. Pour solution into tray (ratios exemplary).
3. Dip sample into solution bath and ensure complete submersion.
4. Remove sample within 5-10 seconds after submerging and shake off excess solution.
5. Place paper onto drying racks. For even drying, hang paper as taut as possible (typically 3-5 hours depending on the ambient conditions, solution, absorbency of paper, and submersion time).
Transparent/Translucent Paper Procedure
1. Cut paper to desired dimensions for samples.
   Exemplary dimensions: 6 cm×6 cm
2. Prepare solutions (add dyes or other additives if desired) with ratio of mL per $cm^2$, for example 1-20 mL per 6 $cm^2$. Pour solution into tray.
3. Submerge sample into solution bath and press lightly to ensure complete coverage. Sample may be submerged, or the solution may be poured over the sample. Ideally, samples will dry on the surface of the silk solution, however this is not necessary.
4. Place tray in drying shelves, but do not remove the paper from the solution. Allow solution to fully dry (typically 2 days depending on the ambient conditions, solution, absorbency of paper, and whether the paper sits on the solution or submerged within it).
5. Trim excess film to desired dimensions of paper.

Various methods to increase airflow over the paper with silk solution may be used to decrease the drying time, including using fans or placing the paper in a well-ventilated location. Other factors such as humidity and temperature will also impact the drying time, and should be taken into consideration.

Pre-Treatment: the paper may also be pre-treated, for example, with a highly basic solution and then left to fully dry prior to applying the silk solution. The basic solutions could include sericin wastewater created while processing the silk fibroin, where the sericin is removed, high molecular weight silk only solution, and/or water. The application of the pre-treatment solution may include soaking, dipping, spraying, or misting.

Post-Treatment: the paper may also undergo post-treatment to alter the performance of the paper. For example, the paper may be treated with alcohol (e.g., methanol, ethanol, isopropanol), low pH solutions, acid, and/or by water annealing. This treatment induces additional crystallinity formation and improves the barrier properties of the film, such as by making the coating less soluble.

FIG. 1 shows an example of transparent (also known as translucent) paper. This paper may be prepared as disclosed above to create a product that is permeated with silk.

Figure 2:
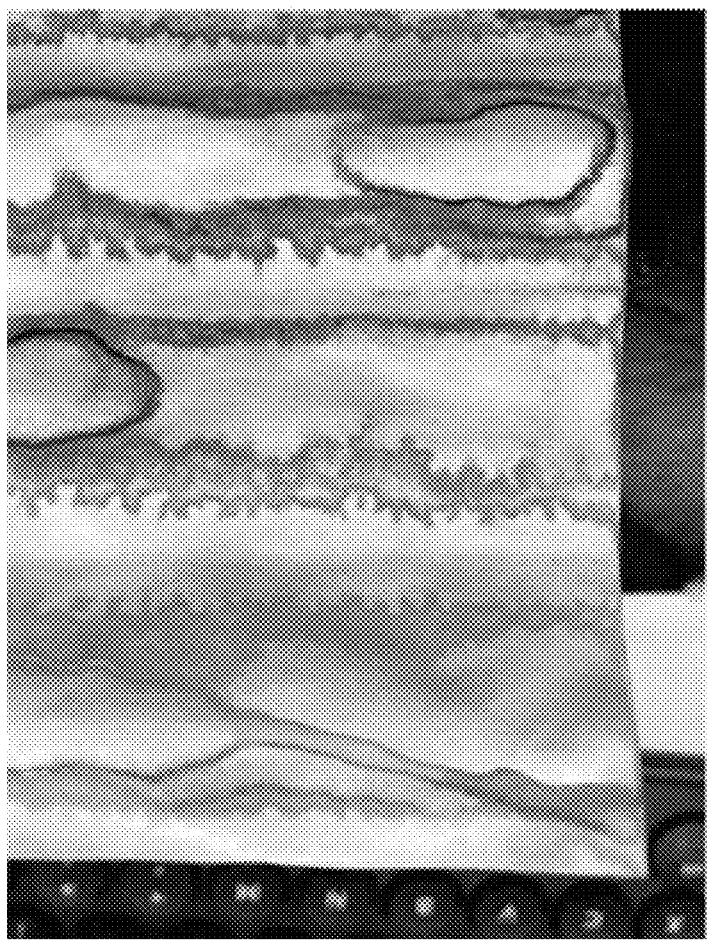
FIG. 2 shows another view of transparent paper, highlighting a section of increased thickness to better illustrate the transparency achieved using the silk solution to form a coating

FIG. 2 shows another view of transparent paper, highlighting a section of increased thickness to better illustrate the transparency achieved using the silk solution to form a coating.

Figure 3A:
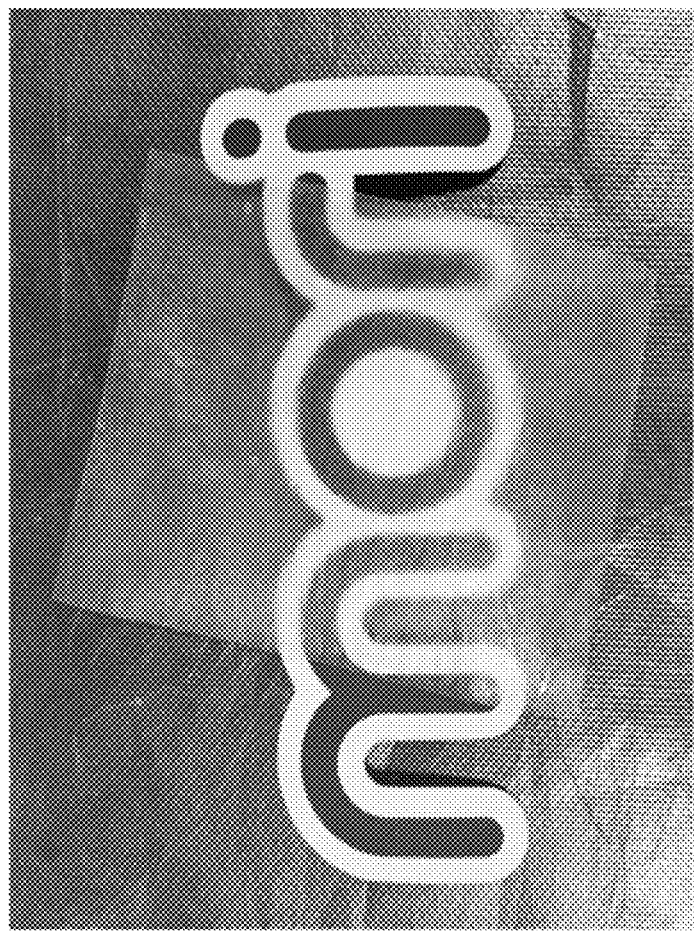
FIGS. 3a and 3b shows the same piece of transparent paper.
Figure 3B:
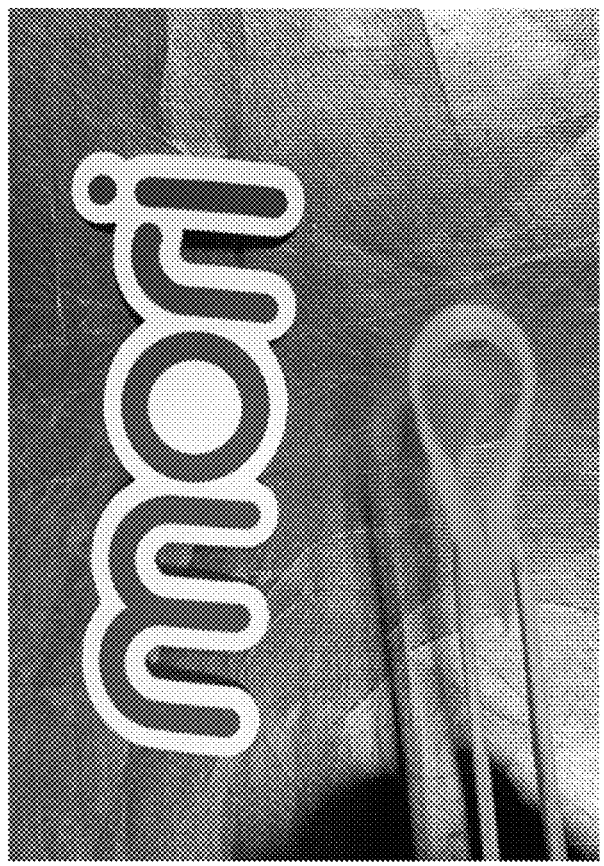

FIGS. 3a and 3b show the same piece of transparent paper. FIG. 3a shows the transparent paper sitting on a tabletop, while FIG. 3b shows the flexibility of the same transparent paper, as the paper may bend even though the silk has permeated the paper. The flexibility of the transparent paper may be improved by including additives in the silk solution, including plasticizers. In this case, FIG. 3b shows a piece of paper that included plasticizers in the silk solution.

The same process described above could be utilized with any substrate or packaging material.

Example 2

Silk Coating Methods

FIGS. 4a-4b and 5a-5b show different methods for applying a silk solution to a piece of paper to create a silk coating.

Figure 4A:
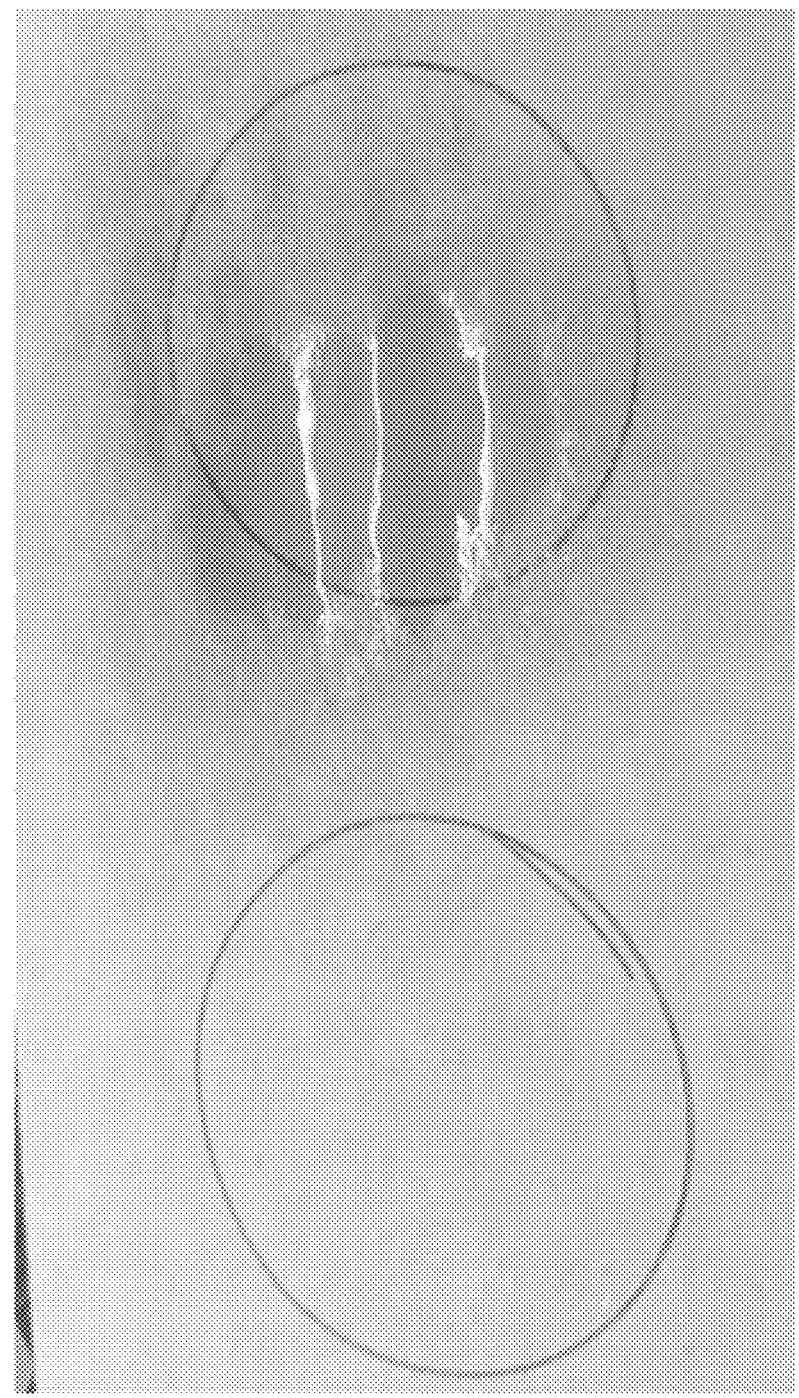
FIGS. 4a-4b and 5a-5b show different methods for applying a silk solution to a piece of paper to create a silk coating.
Figure 4B:
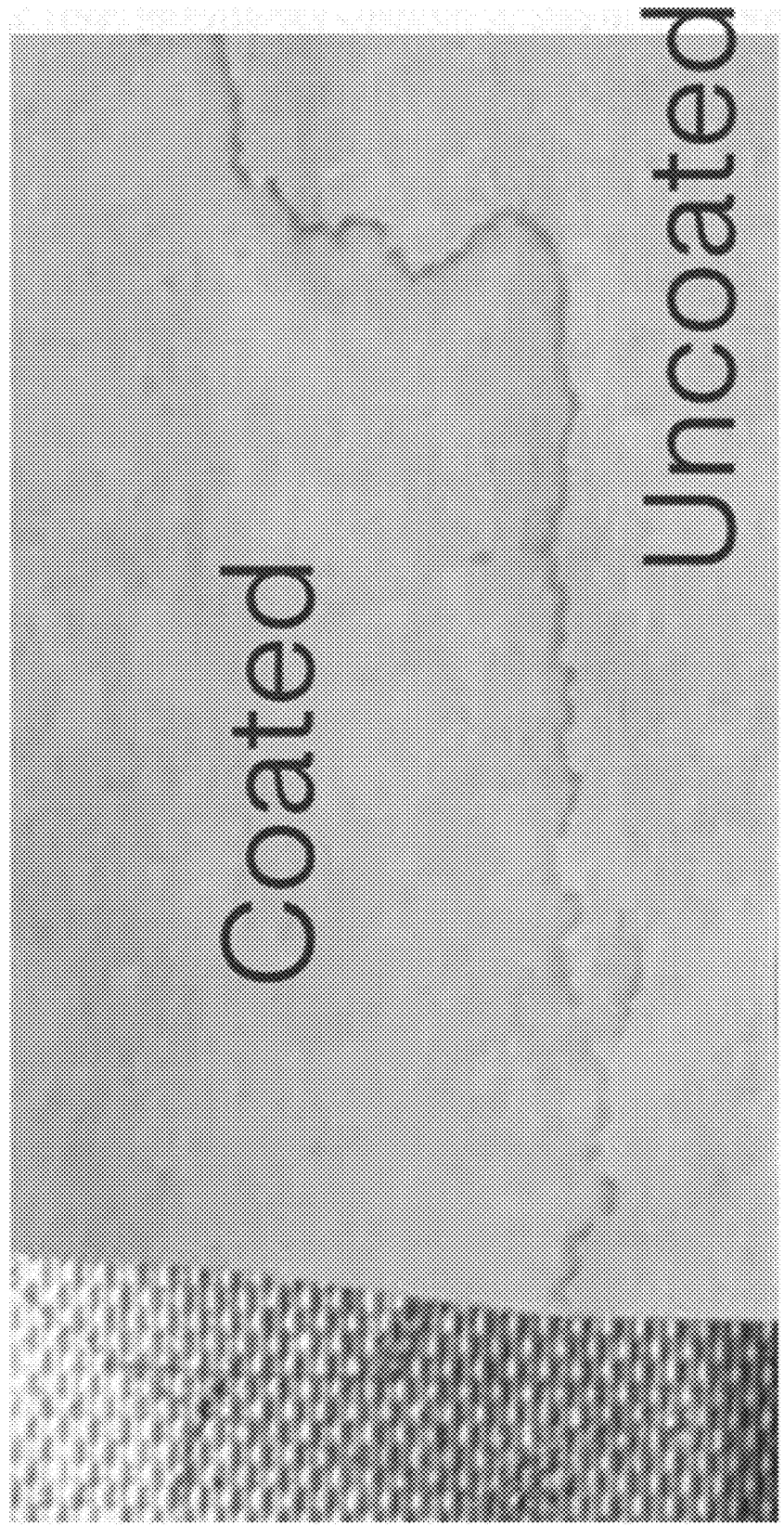

FIG. 4a shows a spray coating that was applied using an airbrush. The airbrush sprays the surface of the substrate, in this case paper, with a silk solution, where the solution is prepared with the same ratios of silk and water as disclosed above. The substrate may be placed on a flat surface and sprayed or held in place by any suitable means (e.g., alligator clips, mounting putty, and binder clips) during spraying. As an example, an airbrush applies atomized particles under high pressure, for example approximately 30 psi. Other possible embodiments include a low pressure spray application, that applies larger droplets onto the paper. In FIG. 4a, the silk solution has just been applied to the circle on the right, while it has not been applied to the circle on the left. As shown in FIG. 4a, the paper is wet after application of the silk solution, but once dry, as shown in FIG. 4b, the coating is almost imperceptible. Additional layers of silk could be added by spray coating the paper as many times as desired.

Figure 5A:
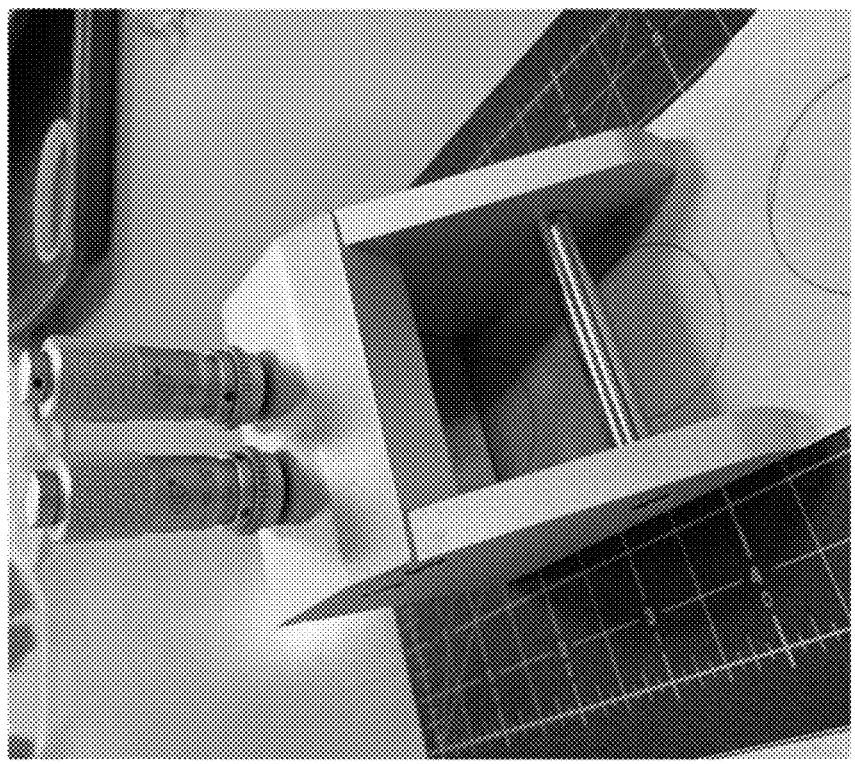
Figure 5B:
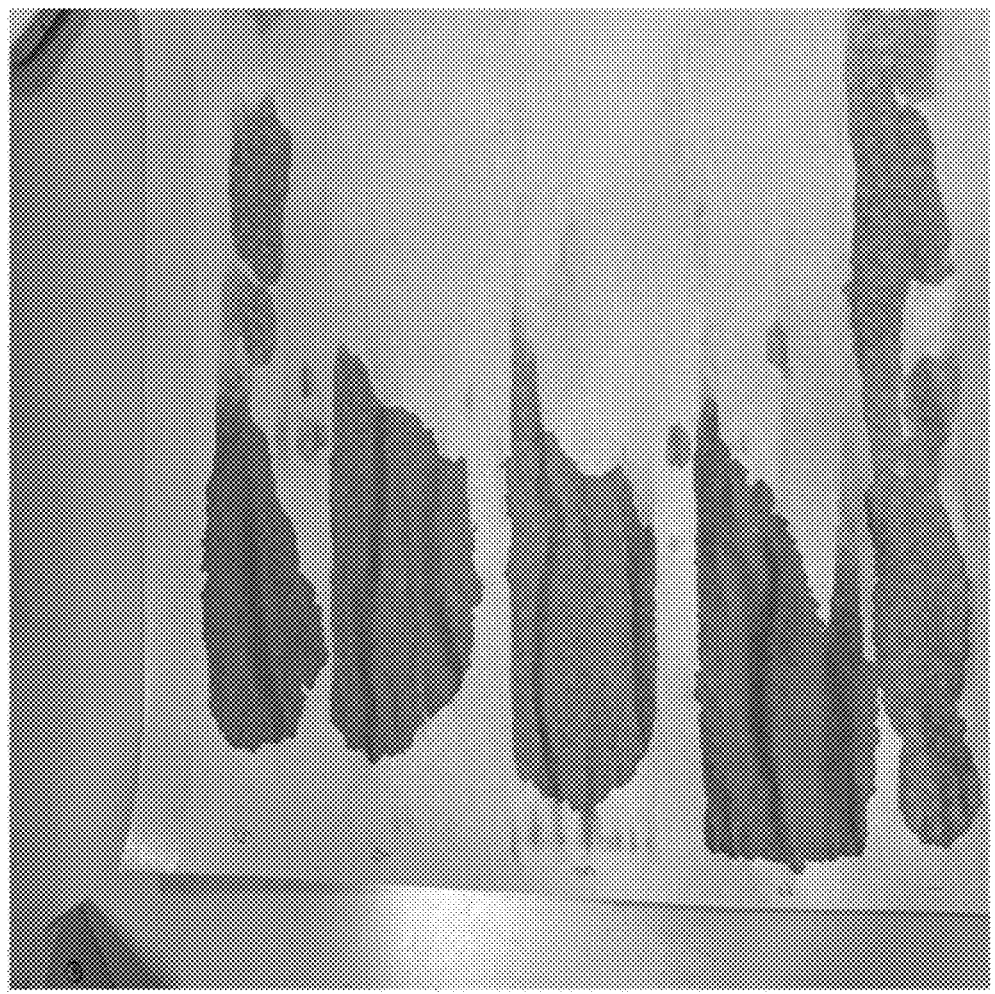

FIG. 5a shows a doctor blade that may be used to apply silk solution to a substrate, which is paper in this example. In this method, the same potential ratio of silk to water as disclosed above in Example 2 may be utilized. The solution is distributed across the substrate using the doctor blade and left to dry, where a coating may be created. FIG. 5b shows the solution after it is spread across the paper by the doctor blade but prior to drying.

Like in Example 2, fans or other methods may be used to increase airflow over the silk solution coated substrate. Similarly to Example 2, pre-treatment and post-treatment could be utilized to obtain the desired coating performance.

Example 3

Free-Standing Silk Film

Figure 6:
FIG. 6 shows the end result of one potential method of preparing a free-standing film, where a free-standing silk film is attached to a frame, in this case an embroidery hoop, prior to separation from the frame.

A free-standing silk film may be created with different methods. FIG. 6 shows the result of one potential method, where a free-standing silk film is attached to a frame, in this case an embroidery hoop, prior to separation from the frame. In this method, a removable material, such as a polyethylene film, is stretched across a frame to create a receptacle that may hold a liquid and prevent it from leaking. A silk solution, with the percent of silk and water disclosed above, is then poured onto the removable material, and held in place by the frame. The silk solution is left to dry (typically between 12-48 hours), until all the water has evaporated, leaving only a silk film on the removeable layer. The removable layer and free-standing silk film are separated, leaving a free-standing silk film that may or may not be attached to a frame. If the free-standing silk film is attached to the frame they may also be separated to create a free-standing silk film.

Various methods to increase airflow over the free-standing silk film may be used to decrease the drying time, including using fans. The free-standing silk film may also receive post-treatment, by for example, application of alcohol, low pH solutions, acid, and/or water annealing, as disclosed in other examples.

Alternatively, the silk solution can be placed in different forms or molds, for example, those made of silicone or other materials that inhibit or decrease binding of the free-standing silk film to the form or mold. Like the above disclosed process, the silk solution placed in the form or mold and left to dry until all the water in the solution evaporates, leaving only the free-standing silk film. The free-standing silk film is then removed from the form or mold. In this way, any shape may be created.

Figure 7:
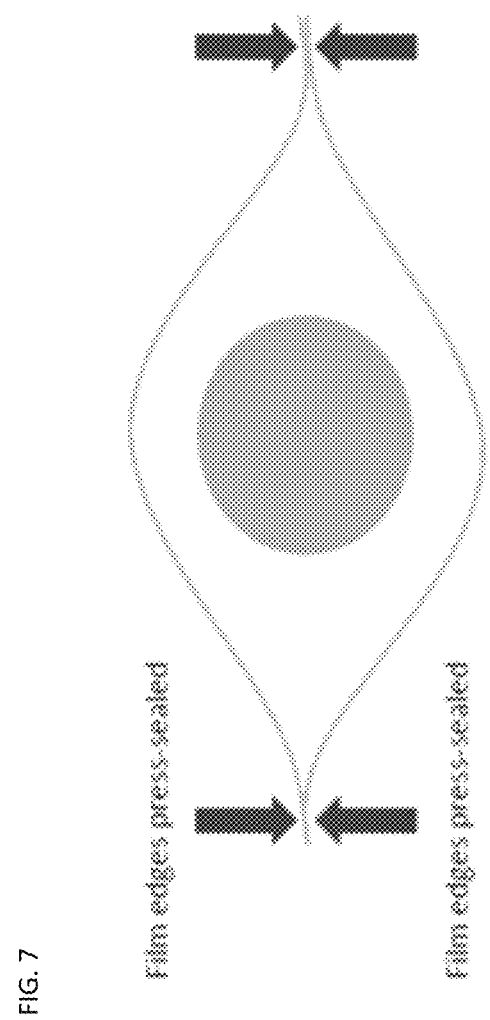
FIG. 7 shows an example of free-standing silk film used to encapsulate a food composition in a package made entirely of free-standing silk film.

FIG. 7 shows an example of free-standing silk used to encapsulate a food composition in a package made entirely of free-standing silk. In this example, two pieces of free-standing silk are placed on either side of a food composition and then crimped or joined together at their edges to form a package surrounding the food composition. The crimping or joining may be accomplished by any suitable method.

Example 5

Silk Laminated Paper

Figure 8:
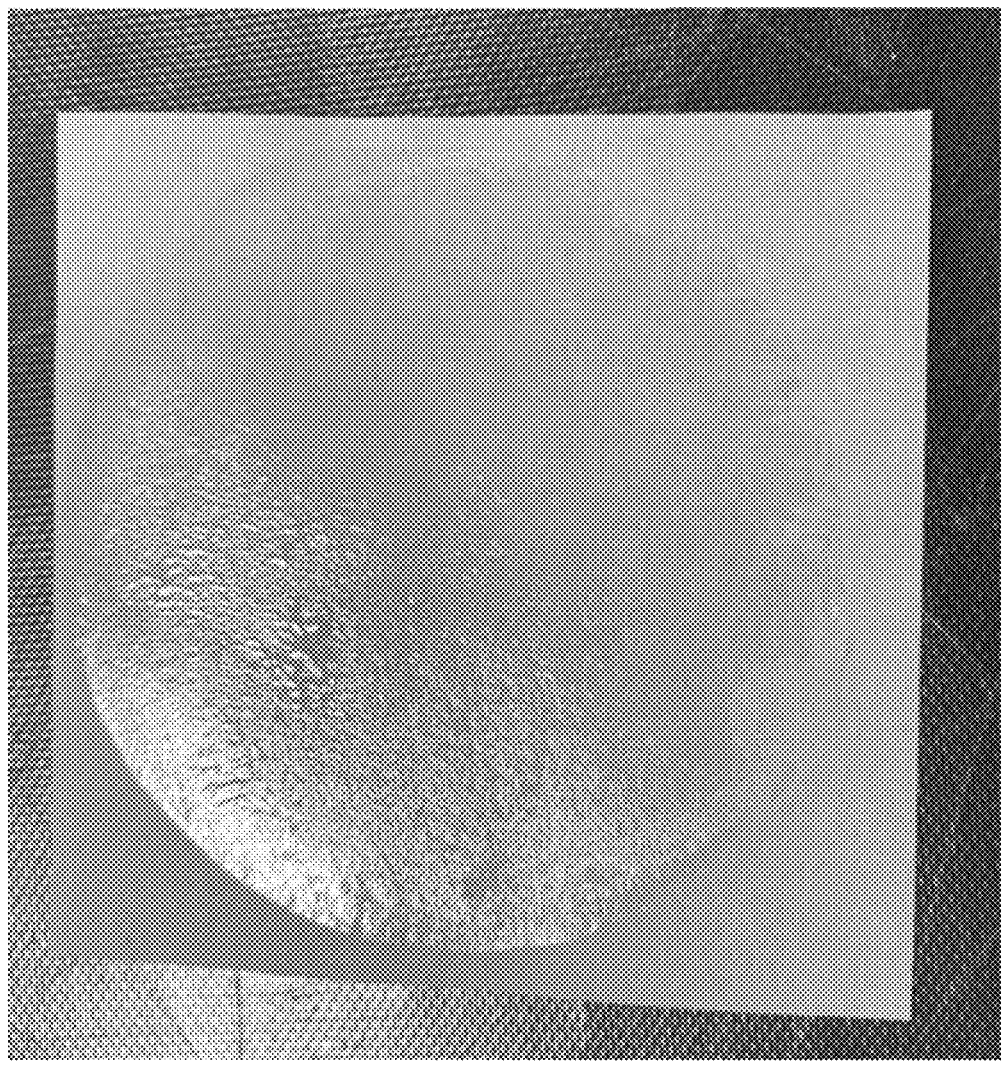
FIG. 8 shows silk laminated paper after lamination has been completed.

FIG. 8 shows silk laminated paper after lamination has been completed. This first step to create silk laminated paper is creating a free-standing silk film, as discussed in Example 4 above. Once the free-standing silk film is created, it is placed on paper and then heat and pressure are applied to both the paper and the free-standing silk film to create a laminated layer of silk on the paper. This may be accomplished using any conventional lamination device or heat sources that can apply pressure, like a t-shirt press or iron. The paper may also be pre-treated by applying water prior to lamination. Multiple layers could be placed on the paper using the same method after the initial layer is added, namely adding additional free-standing silk film layers, and laminating them. Similarly to Example 2, pre-treatment and post-treatment could be utilized to obtain the desired coating performance.

Example 6

Other Results

Figure 9:
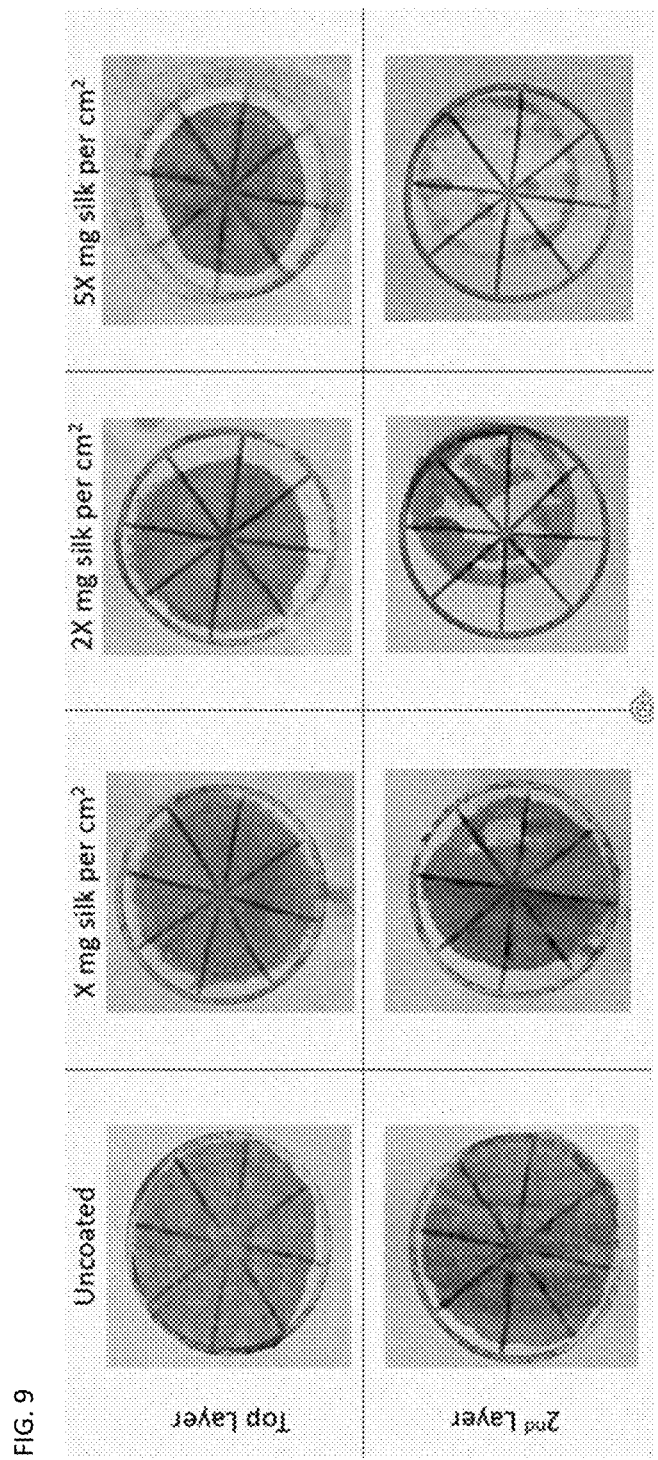
FIG. 9 shows a Cobb test result of a substrate with and without a coating of silk solution.

FIG. 9 shows a Cobb test result. The test measures the absorption and permeability of water through layers of substrates by placing a set amount of water on a substrate for a predetermined amount of time. In this test, uncoated paper, and paper that was spray coated with different amounts of silk solution were tested. The results indicate that increased mass loading of silk (increased amounts of silk per $cm^2$) increases the water resistance of the paper since less wetness was observed in the second layer of paper as the silk mass loading increased.

Figure 10:
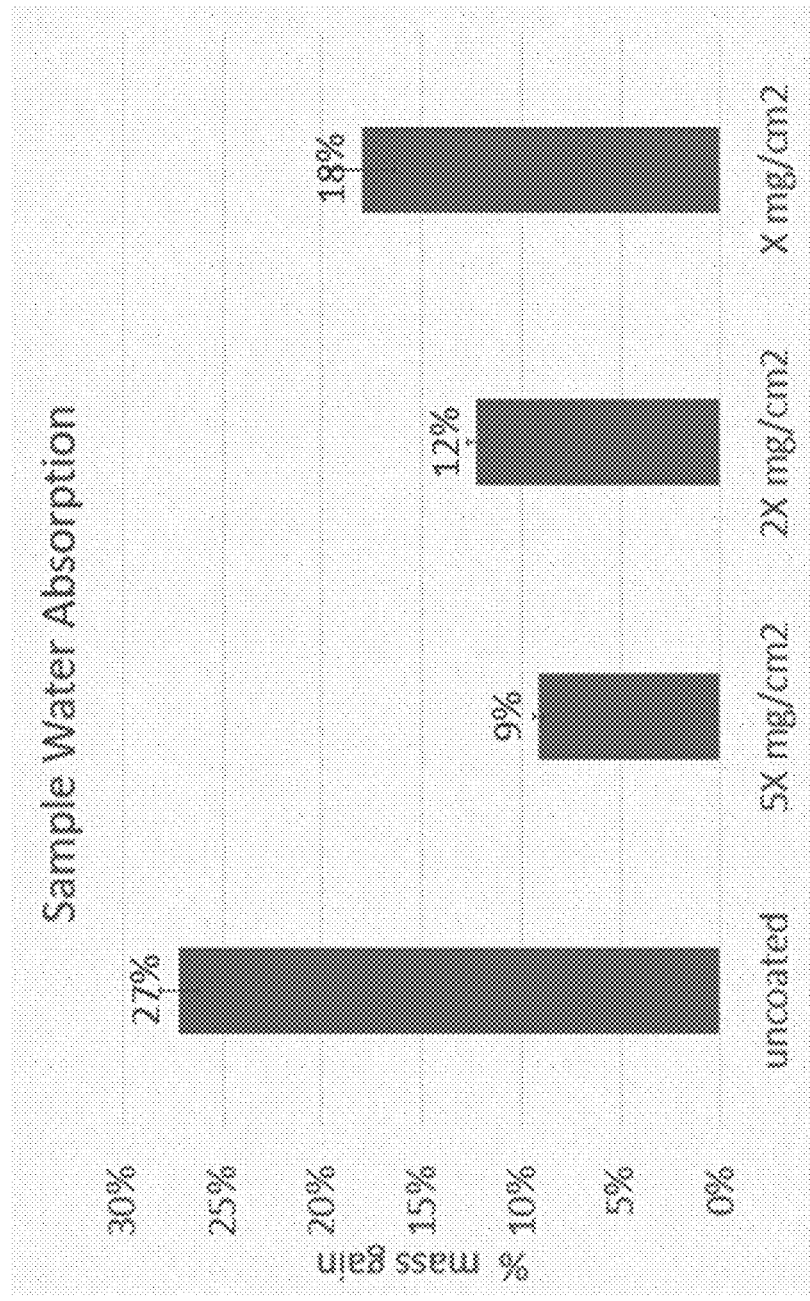
FIG. 10 shows a plot of the results of the Cobb test in FIG. 9.

FIG. 10 shows a plot of the results of the Cobb test in FIG. 9. The graph shows the amount of water absorbed by the paper via weight gain, with decreased water absorption when mass loading of silk increased. In this example, the mass gained in uncoated paper is roughly 27%, while the amount of mass gained by the silk coated samples is approximately 18% (X mg/$cm^2$), 12% (2X mg/$cm^2$), and 9% (5X mg/$cm^2$). This shows a decrease of water absorption from at least 30% to over 65% in the silk coated paper compared to uncoated paper.

Figure 11:
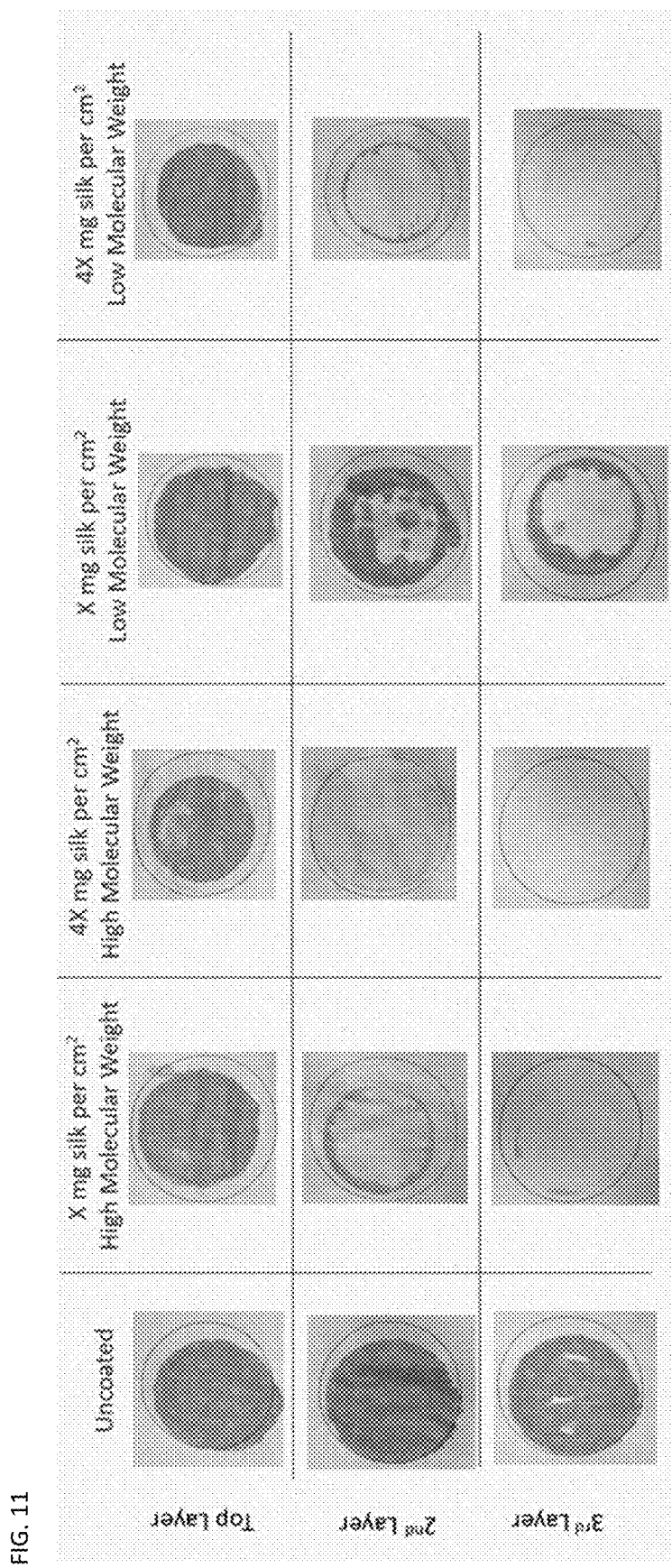
FIG. 11 shows the results of a second Cobb test, where different amounts of silk solution of different molecular weights ($M_w$) are applied to paper.

FIG. 11 shows the results of a second Cobb test, where different amounts of silk solution of different molecular weights are applied to paper. This test shows that higher molecular weight ($M_w$) silk solutions (e.g., a weight average molecular weight of 170-460 kDa) permit less water to permeate lower layers of paper than lower molecular weight ($M_w$) silk solutions (e.g., a weight average molecular weight of 10-200 kDa), and that thicker layers of the same molecular weight silk forms a barrier with decreased water permeation to lower layers of paper.

Figure 12:
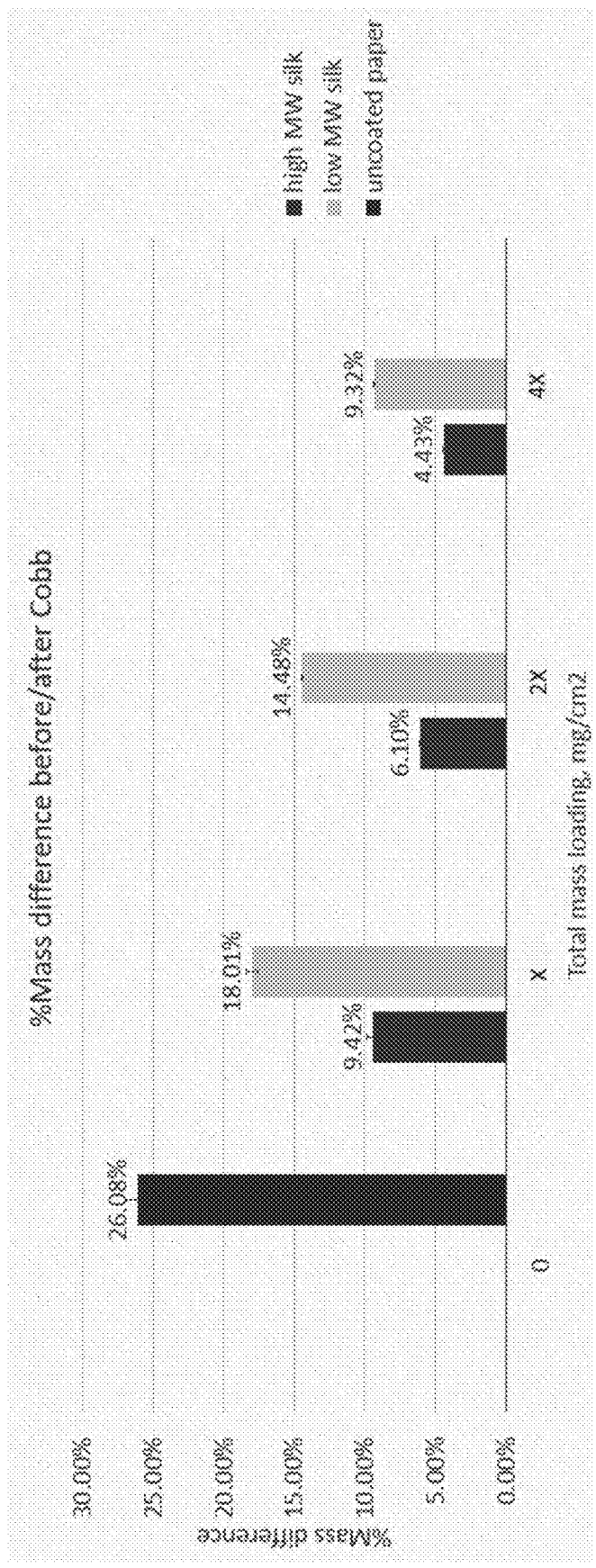
FIG. 12 shows the results of a fourth Cobb test as a graph, where different amounts of silk solution of different molecular weights ($M_w$) are applied to paper.

FIG. 12 shows the results of a fourth Cobb test as a graph, where different amounts of silk solution of different molecular weights are applied to paper. Again, as shown in FIG. 11, higher molecular weight ($M_w$) silk solution forms a stronger barrier limiting water absorption by the paper. Similarly, increased mass loading of silk also decreases water absorption. As the Figure shows, there is a reduction in water absorption of at least 30% (X mg/cm² of low molecular weight ($M_w$) silk) to 80% (4X mg/cm² of high molecular weight ($M_w$) silk).

As a further example, substrates coated with silk and free-standing silk films exhibit decreased OTR compared to an uncoated substrate. In one example, an uncoated substrate was compared to (1) the same substrate submerged once in a silk solution, (2) the same substrate submerged twice in a silk solution, and (3) a free-standing silk film. The OTR of each of these four was measured. The substrate showed dramatic improvements in OTR after submersion, with one submersion reducing OTR by around 99%. The second submersion reduced the OTR even further, by around 99% more compared to the single submersion sample. Finally, the free-standing silk film exhibited very similar OTR to the substrate that was submerged twice. These results exemplify that silk on its own or when applied to a substrate may greatly reduce the OTR in packaging.

Example 7

Silk Package with a Window

Figure 13:
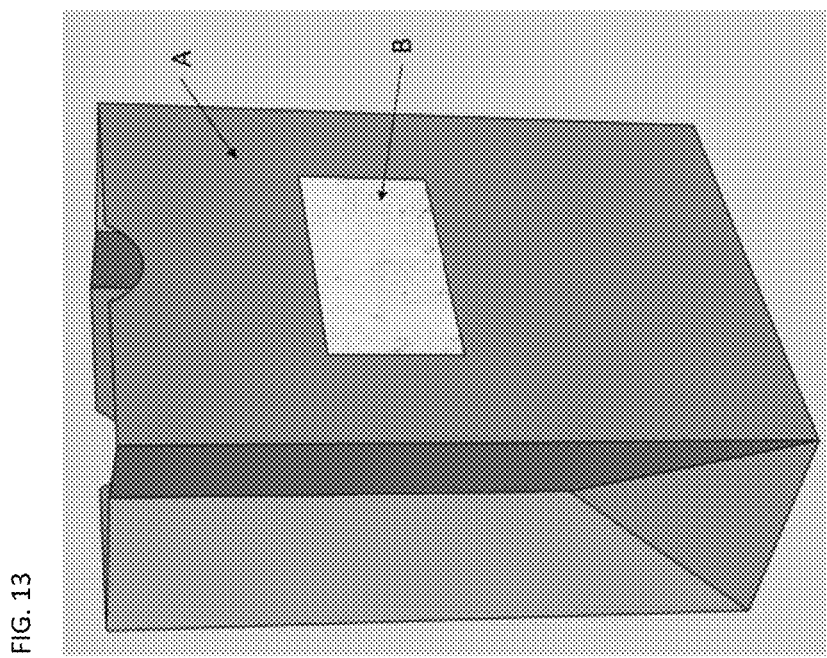
FIG. 13 shows a packaging product with a window in one side that has a silk-based covering over the window. A: bag; B: window.
Figure 14:
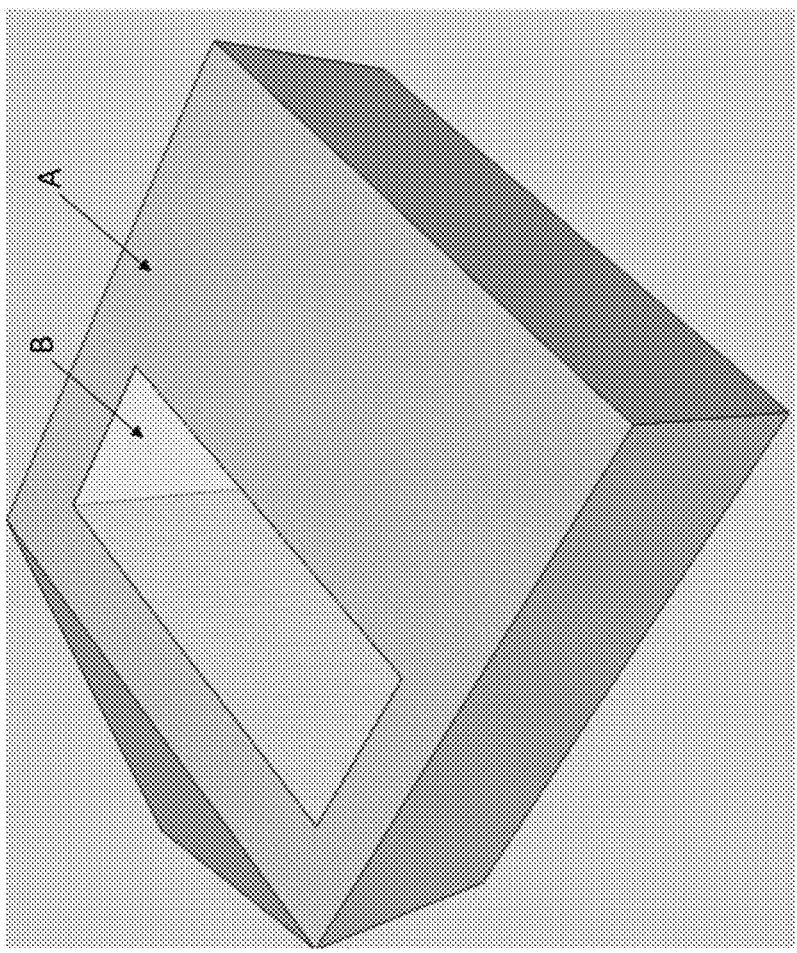
FIG. 14 shows a packaging product with a window in the top side that has a silk-based covering over the window. A: bag; B: window.

FIGS. 13 and 14 show a packaging product with a silk-based window to permit a view of the inside of the packaging product while forming a barrier between the interior of the packaging and the exterior. As seen in FIG. 13, the packaging product (A) is a bag with a window (B) in the front. In one embodiment, a free-standing silk film is incorporated into the packaging over the window so that the interior of the bag is viewable. In another embodiment, a translucent or semi-translucent piece of paper formed using silk is incorporated into the packaging over the window. Any suitable means to secure the window to the packaging product could be utilized, including for example, adhesives, staples, pressing, heat treatment. FIG. 14 shows another packaging product that is a box. The box (A) in FIG. 14 has a window (B) in the top of the box. Similarly to FIG. 13, the window could comprise a free-standing silk film or a translucent or semi-translucent piece of paper formed using silk to permit a view into the box while still maintaining a barrier to the interior of the box.

All publications, patents, patent applications and other documents cited in this application are hereby incorporated by reference in their entireties for all purposes to the same extent as if each individual publication, patent, patent application or other document were individually indicated to be incorporated by reference for all purposes.

While various specific embodiments/aspects have been illustrated and described, it will be appreciated that various changes may be made without departing from the spirit and scope of the disclosure.

We claim:

1. A food-safe food packaging product comprising silk protein and a recyclable and/or compostable substrate, wherein the substrate is treated with a silk solution comprising silk fibroin and/or silk fibroin and sericin to form a silk coating, wherein the silk solution is applied to the substrate by coating, lamination, infusion, and/or impregnation; wherein:
   (i) the oxygen transmission rate of the substrate is decreased by at least 30% after application of the silk coating;
   (ii) the water vapor transmission rate of the substrate is decreased by at least 50% after application of the silk coating;
   (iii) the silk solution comprises silk fibroin fragments within a solvent, wherein:
      0.1% to 25% (weight/volume) of the silk solution is comprised of silk fibroin fragments;
      1% to 20% of the silk fibroin fragments within the silk solution have a molecular weight (MW) of over 400 kDa; and
      10% to 50% of the silk fibroin fragments within the silk solution have a MW of over 300 kDa;
   (iv) the silk coating has a percent crystallinity after application and prior to a post-treatment; and wherein after the post-treatment the silk coating has an increased percent crystallinity that is greater than the percent crystallinity prior to post-treatment and is in the range of about 30% to about 60%, wherein the post-treatment comprises applying an alcohol, low pH solutions, and/or acid;
   (v) food can be held by the food-safe packaging product, whereby a shelf-life of the food is extended, wherein the food-safe packaging product is not water-annealed; and
   (vi) the food-safe packaging product maintains its recyclability and/or compostability after application of the silk coating.

2. The food-safe food packaging product of claim 1, wherein the packaging product is a food storage box, a biodegradable container for food, food wrapping paper, a cap of a container for food, a reusable container for food, a pouch for food, a bag for food, a take-out box for food, a corrugated box for food, a carton for food, a folding carton for food, or a sack for food.

3. The food-safe food packaging product of claim 1, wherein the packaging product is a flexible film or a rigid film, a wrapping film, a stretch film, a bundling film, or a shrink film made from a substrate coated, laminated, infused, and/or impregnated with the silk solution.

4. The food-safe food packaging product of claim 1, wherein the silk solution is a composition that comprises at least one additive, wherein the at least one additive comprises a plasticizer, a surfactant, sorbitol, glycerol, xylitol, polyethylene glycol, mannitol, isomalt, collagen, lipids, rice husks, corn husks, chitosan, citrus limetta peels, clays, cellulose, a crosslinking agent, a metal, an enzyme, a fatty acid, a sugar, a mineral, coloring agent, chelator, antimicrobial, a filler, a scent, a bio-based sensor, a bionanocomposite, a $CO_2$ scavenger/emitter, oxygen scavenger, ethylene scavenger, aroma emitter/odor absorber, time-temperature sensor, ripeness indicator, marine oil, prebiotic, probiotic, encapsulated vitamin, phytochemical, bioavailable flavonoid, vitamin, a phenolic antioxidant or other antioxidant, and a protein or a natural or synthetic amino acid, a nutrient, an anti-oxidant, green tea extract, a rosemary extract, catechin, acerola, chamomile extract, *Malphigia emarginata*, *Camellia sinensis*, epicatechin, epigallocatechin, gallochatechin, epigallocatechin gallates, vitamin A, vitamin E, and/or vitamin C, essential oil, clay nanoparticles, accelerant, and/or an excipient.

5. The food-safe food packaging product of claim 1, wherein the substrate comprises a biodegradable material, a bio-based material, paper, fiber, and/or cardboard.

6. The food-safe food packaging product of claim 1, wherein the silk protein is extracted from silk naturally produced by one or more insect species, wherein the insect species is selected from *Bombyx mandarina, Bombyx mori, Bombyx sinesis, Anaphe moloneyi, Anaphe panda, Anaphe reticulate, Anaphe ambrizia, Anaphe carteri, Anaphe venata, Anapha infracta, Antheraea assamensis, Antheraea assama, Antheraea mylitta, Antheraea pernyi, Antheraea*

*yamamai, Antheraea polyphemus, Antheraea oculea, Anisota senatoria, Apis mellifera, Araneus diadematus, Araneus cavaticus, Automeris io, Atticus atlas, Copaxa multifenestrata, Coscinocera hercules, Callosamia promethea, Eupackardia calleta, Eurprosthenops australis, Gonometa postica, Gonometa rufobrunnea, Hyalophora cecropia, Hyalophora euryalus, Hyalophora gloveri, Miranda auretia, Nephila madagascarensis, Nephila clavipes, Pachypasa otus, Pachypasa atus, Philosamia ricini, Pinna squamosa, Rothschildia hesperis, Rothschildia lebeau, Samia cynthia, Samia ricini,* and *Tetragnatha versicolor.*

7. The food-safe food packaging product of claim 1, wherein the silk protein is further mixed with a composition of the substrate used to manufacture the substrate, such that the final substrate incorporates the silk protein.

8. The food-safe food packaging product of claim 1, wherein the solvent in the silk solution comprises at least one of water, an acid with a pH of under 6.0, or an alcohol.

9. The food-safe food packaging product of claim 1, wherein a portion of the food-safe packaging product does not comprise the silk coating.

10. The food-safe food packaging product of claim 1, wherein the food-safe packaging product has a window in at least one surface, wherein the window consists of a silk-based material that is partially transparent.

11. The food-safe food packaging product of claim 1, wherein the substrate is treated with silk fibroin and/or sericin, optionally with an additive, more than once.

12. The food-safe food packaging product of claim 1, wherein the substrate is pre-treated prior to applying the silk coating, wherein the pre-treatment comprises applying a highly basic solution to the substrate prior to applying the silk coating.

13. The food-safe food packaging product of claim 1, wherein the silk coating has a thickness from about 0.1 μm to about 100 μm.

14. The food-safe food packaging product of claim 1, wherein the silk coating requires no additional steps or processing for recycling beyond those required to recycle the packaging product.

15. A substrate comprising a silk coating, wherein:
  (i) the substrate is comprised of a biodegradable material, a bio-based material, paper, fiber, and/or cardboard;
  (ii) the silk coating comprises a silk fibroin that is applied to or incorporated into the substrate as part of a silk solution to form a silk coating on the substrate;
  (iii) the silk solution comprises the silk fibroin and a solvent, wherein the solvent comprises at least one of water, an acid with a pH of under 6.0, or an alcohol; wherein the silk solution is applied to the substrate by coating, lamination, infusion, and/or impregnation;
  (iv) the silk coating has a thickness from about 0.1 μm to about 100 μm;
  (v) the substrate is designed to hold food and includes a window in at least one surface, wherein the window consists of a silk-based material that is partially transparent;
  (vi) the oxygen transmission rate of the substrate is decreased by at least 30% after application of the silk coating;
  (vii) the water vapor transmission rate of the substrate is decreased by at least 50% after application of the silk coating;
  (viii) the silk solution comprises silk fibroin fragments wherein:
    0.1% to 25% (weight/volume) of the silk solution is comprised of silk fibroin fragments;
    1% to 20% of the silk fibroin fragments within the silk solution have a MW of over 400 kDa; and
    10% to 50% of the silk fibroin fragments within the silk solution have a MW of over 300 kDa;
  and
  (ix) the substrate maintains its recyclability and/or compostability after application of the silk coating.

16. A method of preparing a substrate comprising coating, laminating, infusing, or impregnating a recyclable and/or compostable substrate with a silk solution, wherein:
  (i) the silk solution comprises silk fibroin fragments and a solvent, wherein the solvent comprises at least one of water, an acid with a pH of under 6.0, or an alcohol;
  (ii) the oxygen transmission rate of the substrate is decreased by at least 30% after application of the silk solution;
  (iii) the water vapor transmission rate of the substrate is decreased by at least 50% after application of the silk solution;
  (iv) the silk coating has a percent crystallinity after application and prior to a post-treatment; and wherein after the post-treatment the silk coating has an increased percent crystallinity that is greater than the percent crystallinity prior to post-treatment and is in the range of about 30% to about 60% after the post-treatment step, wherein the post-treatment comprises applying an alcohol, low pH solutions, and/or acid;
  (v) 0.1% to 25% (weight/volume) of the silk solution is comprised of silk fibroin fragments, wherein:
    1% to 20% of the silk fibroin fragments within the silk solution have a MW of over 400 kDa; and
    10% to 50% of the silk fibroin fragments within the silk solution have a MW of over 300 kDa;
  and
  (vi) the substrate maintains its recyclability and/or compostability after application of the silk coating.

17. The method of claim 16, wherein the substrate is coated using a spray device; wherein the spray device applies the silk solution over the entirety of the substrate; and wherein the substrate is left to dry until the silk solution is no longer a liquid.

18. The method of claim 16, wherein the substrate is coated by dip coating using the following steps:
  preparing the silk solution and placing it in a container;
  dipping the substrate in the silk solution so that it is fully submerged in the silk solution;
  removing the substrate from the silk solution after being submerged for 5-10 seconds;
  shaking off the excess silk solution from the substrate;
  placing the substrate on drying racks for 3-5 hours.

* * * * *